United States Patent
Schultz et al.

(10) Patent No.: US 10,893,005 B2
(45) Date of Patent: Jan. 12, 2021

(54) PARTIAL RECONFIGURATION FOR NETWORK-ON-CHIP (NOC)

(71) Applicant: Xilinx, Inc., San Jose, CA (US)

(72) Inventors: David P. Schultz, Longmont, CO (US); Ian A. Swarbrick, Santa Clara, CA (US); Jun Liu, San Jose, CA (US); Raymond Kong, San Jose, CA (US); Herve Alexanian, San Jose, CA (US)

(73) Assignee: XILINX, INC., San Jose, CA (US)

( * ) Notice: Subject to any disclaimer, the term of this patent is extended or adjusted under 35 U.S.C. 154(b) by 165 days.

(21) Appl. No.: 16/133,357

(22) Filed: Sep. 17, 2018

(65) Prior Publication Data
US 2020/0092230 A1    Mar. 19, 2020

(51) Int. Cl.
| | | |
|---|---|---|
| *H04L 12/931* | (2013.01) | |
| *G06F 15/78* | (2006.01) | |
| *H04L 12/933* | (2013.01) | |
| *H04L 12/761* | (2013.01) | |

(52) U.S. Cl.
CPC .......... *H04L 49/65* (2013.01); *G06F 15/7825* (2013.01); *G06F 15/7882* (2013.01); *H04L 49/109* (2013.01); *H04L 45/16* (2013.01)

(58) Field of Classification Search
CPC ....... H04L 49/65; H04L 49/109; H04L 45/16; G06F 15/77825; G06F 15/7882
See application file for complete search history.

(56) References Cited

U.S. PATENT DOCUMENTS

| | | | |
|---|---|---|---|
| 8,934,377 B2 * | 1/2015 | Kumar ................. | H04L 47/2425 370/254 |
| 9,569,221 B1 * | 2/2017 | Chaudhri .............. | G06F 9/5094 |
| 9,722,613 B1 | 8/2017 | Schultz et al. | |
| 10,243,882 B1 * | 3/2019 | Swarbrick ............ | H04L 49/109 |
| 10,505,548 B1 * | 12/2019 | Swarbrick ........ | H03K 19/17768 |
| 10,608,640 B1 | 3/2020 | Orthner et al. | |
| 2006/0209851 A1 * | 9/2006 | Scudder ................. | H04L 45/22 370/401 |
| 2014/0189039 A1 * | 7/2014 | Dalton .............. | G06F 15/17331 709/213 |
| 2015/0109916 A1 * | 4/2015 | Locatelli ............... | H04L 49/109 370/230 |

(Continued)

OTHER PUBLICATIONS

Krasteva et al., "Virtual Architectures for Partial Runtime Reconfigurable Systems, Application to Network on Chip based SoC Emulation", 2008, IEEE Publishing.*

(Continued)

*Primary Examiner* — Todd L Barker
(74) *Attorney, Agent, or Firm* — Patterson + Sheridan, LLP

(57) ABSTRACT

Examples described herein provide for an electronic circuit, such as a System-on-Chip (SoC), having a Network-on-Chip (NoC). The NoC is configurable and has capabilities to be partially reconfigured. In an example, a NoC on an integrated circuit is configured. Subsystems on the integrated circuit communicate via the NoC. The NoC is partially reconfigured. A first subset of the NoC is reconfigured during the partial reconfiguration, and a second subset of the NoC is capable of continuing to pass communications uninterruptedly during the partial reconfiguration. After the partial reconfiguration, two or more of the subsystems communicate via the first subset of the NoC.

22 Claims, 13 Drawing Sheets

(56) References Cited

U.S. PATENT DOCUMENTS

| | | | |
|---|---|---|---|
| 2016/0344629 A1* | 11/2016 | Gray | H04L 45/60 |
| 2016/0357668 A1* | 12/2016 | Rencs | G06F 9/462 |
| 2017/0075838 A1* | 3/2017 | Nooney | H04L 49/1515 |
| 2018/0083868 A1* | 3/2018 | Cheng | H04L 45/44 |
| 2019/0089619 A1* | 3/2019 | Yeager | H04L 43/50 |
| 2019/0095372 A1* | 3/2019 | Huang | H04L 63/0272 |
| 2019/0260388 A1* | 8/2019 | Wegener | H04B 1/66 |
| 2019/0260504 A1* | 8/2019 | Philip | H04L 1/0045 |

OTHER PUBLICATIONS

U.S. Appl. No. 15/486,969, filed Apr. 13, 2017, Swarbrick et al., San Jose, CA USA.

Pionteck T, et al, "Applying Partia; Reconfiguration to Networks-on-Chips", Field Programmable Logic and Applications 2006. FPL '06. International Conference On, IEEE, PI, Aug. 28, 2006 (Aug. 28, 2006), pp. 1-6, Xp031332256, ISBN: 978-1-4244-03212-7 p. 2, left hand column, Line 23.

Ahmed Ramy et al., "Impact of Dynamic Partial Reconfiguration on Connect Network-on*-Chip for FPGAs" 2018 13th International Conference on Design & Technology of Integrated Systems in Nanscale Era (DTIS), IEEE, Apr. 9, 2018 (Apr. 9, 2018), pp. 1-5 XP033352085, DOI: 10.1109/dtis.2018.8368587 (retrieved on May 29, 2018) p. 1, right-hand column, line 31—p. 2, right-hand column, line 6.

\* cited by examiner

|  | ID1 | ID2 | ID3 | ID4 | ID5 | ID6 | ID7 | ○ ○ ○ |
|---|---|---|---|---|---|---|---|---|
| 0-0 | xx | xx | xx | xx | xx | xx | xx | ○ ○ ○ |
| 0-1 | xx | xx | xx | xx | xx | xx | xx | ○ ○ ○ |
| 0-2 | xx | xx | xx | xx | xx | xx | xx | ○ ○ ○ |
| 0-3 | xx | xx | xx | xx | xx | xx | xx | ○ ○ ○ |
| 0-4 | xx | xx | xx | xx | xx | xx | xx | ○ ○ ○ |
| 0-5 | xx | xx | xx | xx | xx | xx | xx | ○ ○ ○ |
| 0-6 | xx | xx | xx | xx | xx | xx | xx | ○ ○ ○ |
| 0-7 | xx | xx | xx | xx | xx | xx | xx | ○ ○ ○ |
| 1-0 | xx | xx | xx | xx | xx | xx | xx | ○ ○ ○ |
| 1-1 | xx | xx | xx | xx | xx | xx | xx | ○ ○ ○ |
| 1-2 | xx | xx | xx | xx | xx | xx | xx | ○ ○ ○ |
| 1-3 | xx | xx | xx | xx | xx | xx | xx | ○ ○ ○ |
| 1-4 | xx | xx | xx | xx | xx | xx | xx | ○ ○ ○ |
| 1-5 | xx | xx | xx | xx | xx | xx | xx | ○ ○ ○ |
| 1-6 | xx | xx | xx | xx | xx | xx | xx | ○ ○ ○ |
| ○ ○ ○ | ○ ○ ○ | ○ ○ ○ | ○ ○ ○ | ○ ○ ○ | ○ ○ ○ | ○ ○ ○ | ○ ○ ○ | ○ ○ ○ |

PARTIAL RECONFIGURATION FOR NETWORK-ON-CHIP (NOC)

TECHNICAL FIELD

Examples of the present disclosure generally relate to electronic circuits and, in particular, to an electronic circuit including a Network-on-Chip (NoC) with partial reconfiguration capabilities.

BACKGROUND

Advances in integrated circuit technology have made it possible to embed an entire system, such as including a processor core, a memory controller, and a bus, in a single semiconductor chip. This type of chip is commonly referred to as a System-on-Chip (SoC). Further, some SoCs have been developed that include a Network-on-Chip (NoC) for communications between subsystems of the SoC. NoCs have generally offered increased scalability and enhanced performance to SoCs.

SUMMARY

Examples described herein provide for an electronic circuit, such as a System-on-Chip (SoC), having a Network-on-Chip (NoC). The NoC is configurable and has capabilities to be partially reconfigured.

An example of the present disclosure is a method for operating an integrated circuit. A NoC on the integrated circuit is configured. Subsystems on the integrated circuit communicate via the NoC. The NoC is partially reconfigured. A first subset of the NoC is reconfigured during the partial reconfiguration, and a second subset of the NoC is capable of continuing to pass communications uninterruptedly during the partial reconfiguration. After the partial reconfiguration, two or more of the subsystems communicate via the first subset of the NoC.

Another example of the present disclosure is an integrated circuit. The integrated circuit includes a first subsystem on a chip; a second subsystem on the chip; and a NoC on the chip and communicatively connected between the first subsystem and the second subsystem. The NoC is configurable to establish communication paths through the NoC. The NoC is configured to be partially reconfigurable to reconfigure a first subset of the communication paths while a second subset of the communication paths are capable of passing communications uninterruptedly.

Another example of the present disclosure is a system. The system includes a processor and a computer-readable medium storing instructions which, when executed by the processor, cause the processor to perform operations. The operations include generating a first physical description of a first circuit design comprising an initial reconfigurable module and a static module, generating a second physical description of a second circuit design comprising a subsequent reconfigurable module, and generating one or more programming device images based on the first physical description and the second physical description. The first physical description corresponds to a physical layout of a target integrated circuit. The target integrated circuit comprises a NoC. The first physical description includes a reconfigurable partition that includes circuit components of paths through the NoC corresponding to the initial reconfigurable module. The second physical description is based on the first physical description and includes the reconfigurable partition that includes circuit components of reconfigured paths through the NoC corresponding to the subsequent reconfigurable module. The one or more programming device images are capable of being loaded on the target integrated circuit to implement the first circuit design upon being initially configured and to implement the second circuit design upon being partially reconfigured.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
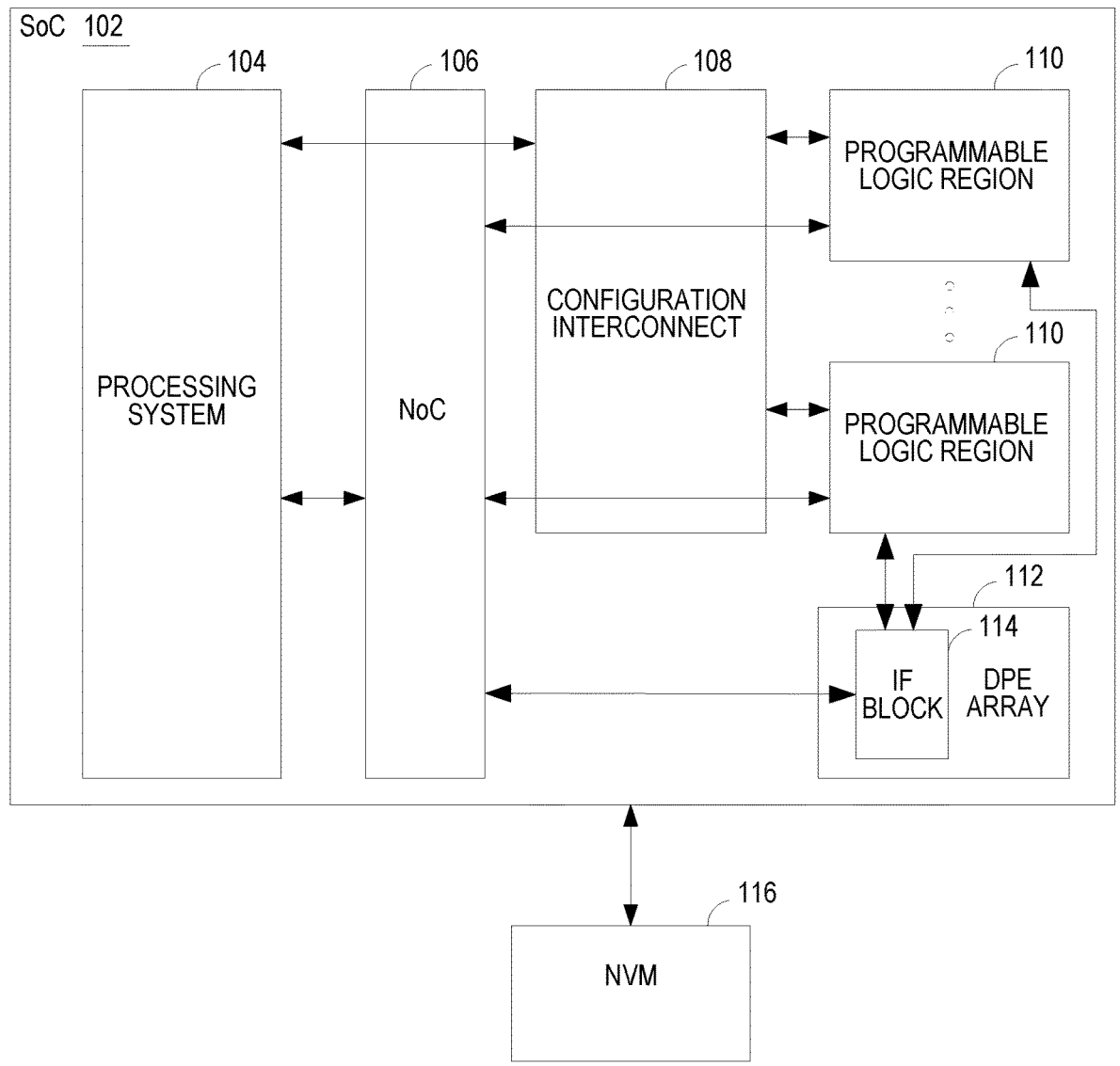
FIG. 1 is a block diagram depicting a System-on-Chip (SoC), according to an example of the present disclosure.

Examples described herein provide for an electronic circuit, such as a System-on-Chip (SoC), having a Network-on-Chip (NoC). The NoC is configurable and has capabilities to be partially reconfigured. The partial reconfiguration of the NoC can be enabled by separating registers that form a routing table into independent registers so that writing new register values affect one or a few paths without affecting other paths, and by adding controls to NoC interface blocks that allow packets transmitted through various paths to be halted in a non-disruptive manner. Additionally, a circuit design tool and method can generate one or more programming device images (PDIs) to implement partial reconfiguration of the NoC and various subsystems. The circuit design tool and method can honor constraints on the partial reconfiguration of the NoC to implement various use case scenarios.

Previously, NoCs that were not partially reconfigurable were implemented in various SoCs. For SoCs that included a subsystem that was programmable and that had partial reconfiguration capabilities, a NoC that was not partially reconfigurable was a limitation on the partial reconfiguration of the subsystem. Partially reconfiguring the subsystem would have to maintain previously configured interfaces with the NoC or would require a complete reconfiguration of the NoC, which would interrupt communications between applications that were not being reconfigured. This caused a significant limitation on the flexibility of programmable designs. This is illustrated in circuit designs using a field programmable gate array (FPGA). Some FPGAs include fabric (e.g., programmable logic) that could be partially reconfigured, but a NoC in the FPGA would limit how the fabric could be partially reconfigured.

Examples described herein provide solutions to the limits of NoCs that are not partially reconfigurable. Examples described herein provide for an architecture of an integrated circuit (such as a programmable logic device like an FPGA) that permits for partial reconfiguration of a NoC in the integrated circuit. Further examples described herein provide for methods and systems for generating PDIs for partial reconfiguration of a NoC.

A NoC can be incorporated in a SoC device architecture. The NoC can be a general purpose, programmable, high-speed bus that includes communication paths between different subsystems on the device. Examples include processing system to double data rate (DDR) memory paths, peripheral component interconnect express (PCIe) interface to programmable logic region paths, kernel-to-kernel paths, and data processing engine (DPE) array to DDR memory paths. Features can be added to the NoC hardware implementation that allow the path configuration to be changed using partial reconfiguration (PR). These enhancements can allow the NoC to be flexible, like other components within the SoC.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a SoC 102 according to an example. The SoC 102 is an integrated circuit (IC) comprising a processing system 104, a NoC 106, a configuration interconnect 108, one or more programmable logic regions 110, and a data processing engine (DPE) array 112. The SoC 102 can be coupled to external circuits, such as a nonvolatile memory (NVM) 116. The NVM 116 can store data (e.g., a programming device image (PDI)) that can be loaded to the SoC 102 for configuring the SoC 102, such as configuring the NoC 106, the programmable logic region(s) 110, and DPE array 112.

In general, the processing system 104 is connected to the programmable logic region(s) 110 through the NoC 106 and through the configuration interconnect 108. The processing system 104 is further connected to the DPE array 112 (e.g., an interface (IF) block 114 of the DPE array 112) through the NoC 106. The DPE array 112 (e.g., the IF block 114) is connected to the one or more programmable logic regions 110 through the NoC 106 and through direct connections.

The processing system 104 can include one or more processor cores. For example, the processing system 104 can include a number of ARM-based embedded processor cores. The programmable logic region(s) 110 can include any number of configurable logic blocks (CLBs), which may be programmed or configured using the processing system 104 through the configuration interconnect 108. For example, the configuration interconnect 108 can enable, for example, frame-based programming of the fabric of the programmable logic region(s) 110 by a processor core of the processing system 104 (such as a platform management controller (PMC) described further below).

The DPE array 112 includes a plurality of interconnected DPEs. Each of the DPEs may be programmable. For example, each DPE may include a core that is capable of providing data processing capabilities. A DPE may also include a memory module that is accessible by the core. A DPE further may include a DPE interconnect that is capable of implementing communications with other DPEs of the DPE array 112 and/or communications with different subsystems. The DPE interconnect further may support configuration of the DPE. The IF block 114 may include one or more tiles. The IF block 114 provides an interface between DPEs of DPE array 112 and other portions of the SoC 102, such as the processing system 104 and one or more programmable logic regions 110.

The SoC 102 illustrated in FIG. 1 and described above is an example implementation in which a NoC 106 can be used. Other examples implementing aspects described herein may include or omit various subsystems or components. For example, an example SoC may omit subsystems such as the programmable logic regions 110 and the DPE array 112. Further, other subsystems may be included, such as a non-programmable accelerator, which may be in addition to or in the place of the DPE array 112.

Figure 2:
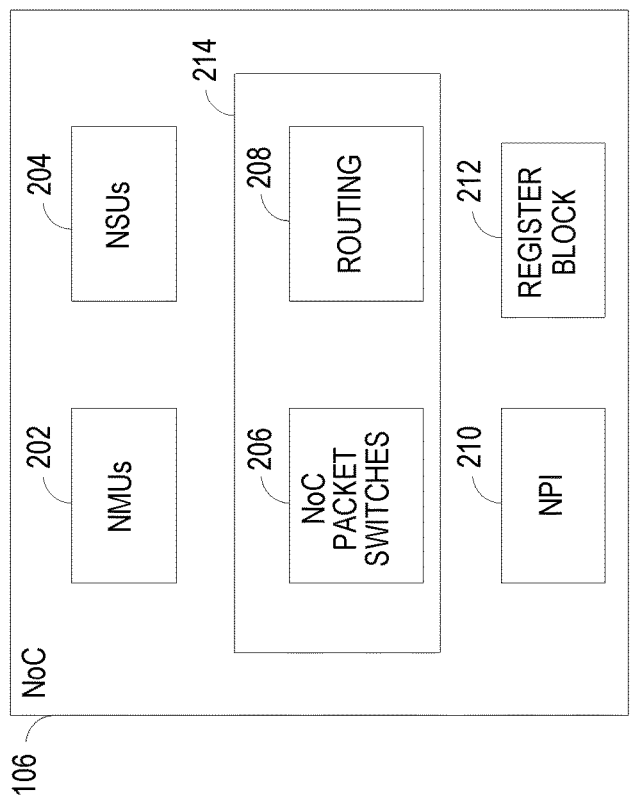
FIG. 2 is a block diagram depicting a Network-on-Chip (NoC), according to an example of the present disclosure.

FIG. 2 is a block diagram depicting the NoC 106 according to an example. The NoC 106 includes NoC master units (NMUs) 202, NoC slave units (NSUs) 204, a network 214, NoC peripheral interconnect (NPI) 210, and register blocks 212. Each NMU 202 is an ingress circuit (e.g., ingress to the NoC 106) that connects a master circuit to the NoC 106. Each NSU 204 is an egress circuit (e.g., egress from the NoC 106) that connects the NoC 106 to a slave endpoint circuit. An NMU 202 can, in addition to being an ingress circuit, also have egress capabilities. The NMUs 202 are connected to the NSUs 204 through the network 214. In some examples, the network 214 includes NoC packet switches (NPSs) 206 and routing 208 between the NPSs 206. Each NPS 206 performs switching of NoC packets. The NPSs 206 are connected to each other and to the NMUs 202 and NSUs 204 through the routing 208 to implement a plurality of paths. The switching capabilities of each NPS 206 permit one or multiple paths to be implemented through each NPS 206. The NPSs 206 also support multiple virtual channels per path.

The NPI 210 includes circuitry to program the NMUs 202, NSUs 204, and NPSs 206. The NPI 210 includes a peripheral interconnect coupled to the register blocks 212 for programming thereof to set functionality of the corresponding NMUs 202, NSUs 204, and NPSs 206. The register blocks 212 in the NoC 106 support interrupts, quality of service (QoS), error handling and reporting, transaction control, power management, and address mapping control. The register blocks 212 for the NMUs 202 and NSUs 204 include registers that can be written to control the operations of the NMUs 202 and NSUs 204. For example, the register blocks 212 can include registers that enable/disable the NMUs 202 and NSUs 204, cause the NMUs 202 and NSUs 204 to not transmit and/or to reject any subsequent transaction request to or from the NPSs 206, and/or instruct the NMUs 202 and NSUs 204 to complete any pending transaction request received from the NPSs 206. The register blocks 212 of the NPSs 206 can include registers that form a routing table for the corresponding NPS 206. The register blocks 212 can be initialized in a usable state before being reprogrammed, such as by writing to the register blocks 212 using write requests. Configuration data for the NoC 106 can be stored in the NVM 116 and provided to the NPI 210 (from the PMC) for programming the NoC 106 and/or other slave endpoint circuits.

Figure 3:
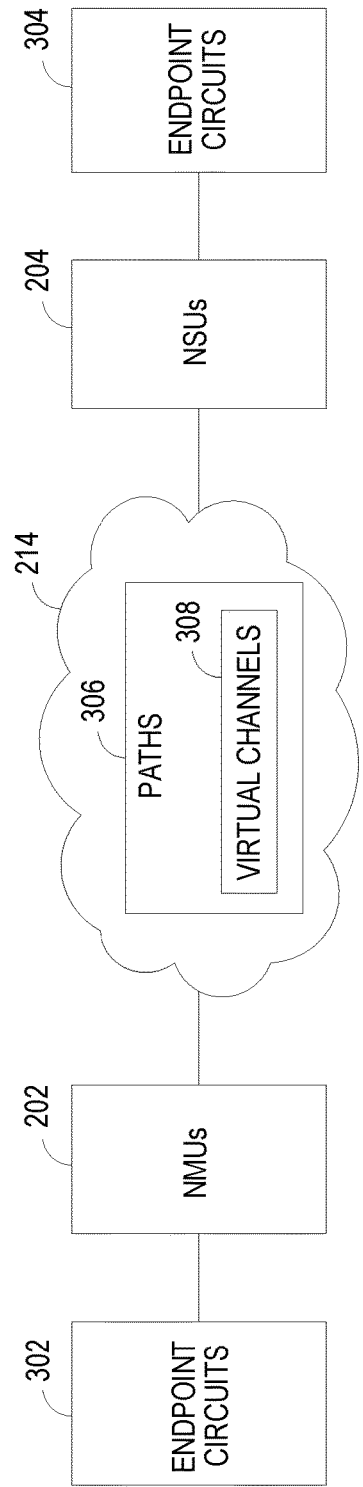
FIG. 3 is a block diagram depicting connections between endpoint circuits through the NoC, according to an example of the present disclosure.

FIG. 3 is a block diagram depicting connections between endpoint circuits through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 110, or a circuit in another subsystem. Each endpoint circuit in the programmable logic region 110 can be a dedicated circuit (e.g., a hardened circuit) or a circuit configured in programmable logic, for example.

The network 214 includes a plurality of paths 306. The paths 306 are implemented by programming the NoC 106. Each path 306 includes one or more NPSs 206 and associated routing 208. An NMU 202 connects with an NSU 204 through at least one path 306. A path 306 can also have one or more virtual channels 308.

Figure 4:
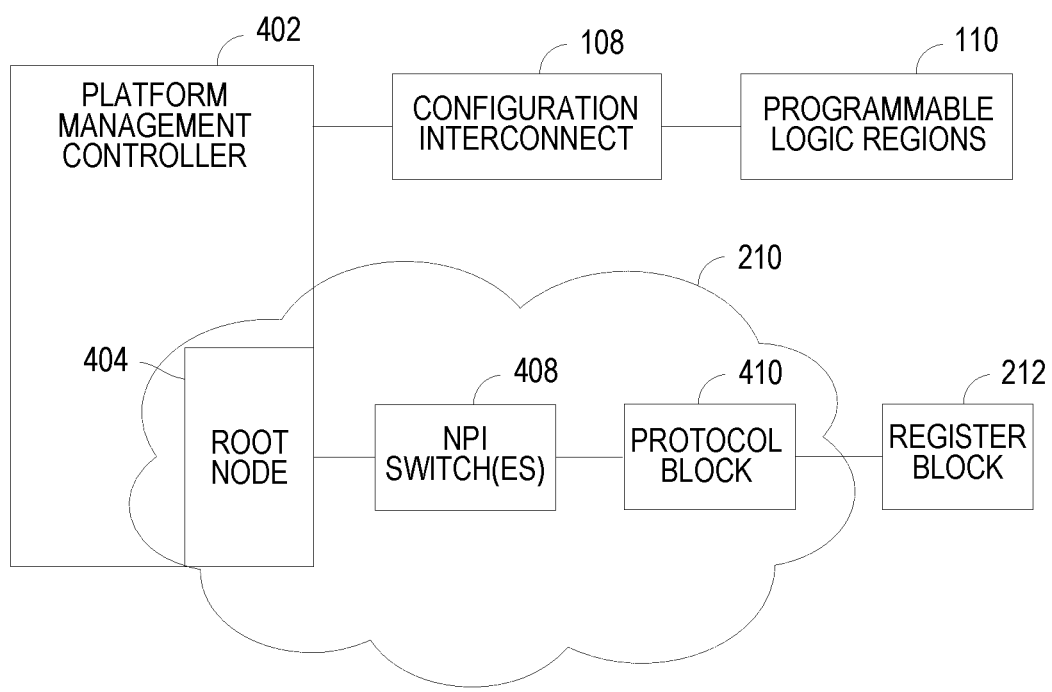
FIG. 4 is a block diagram depicting connections to a register block through a NoC Peripheral Interconnect (NPI), according to an example of the present disclosure.

FIG. 4 is a block diagram depicting connections to a register block 212 through the NPI 210 according to an example. To connect to a register block 212, the NPI 210 includes a root node 404, one or more NPI switches 408, and a protocol block 410. The root node 404, in some examples, resides on a PMC 402, which may further reside in the processing system 104, although in other examples, the root node 404 can be an independent circuit or reside on another system or circuit. Generally, the root node 404 can packetize a transaction request into a format implemented by the NPI 210 and can transmit a memory mapped transaction request to an NPI switch 408, which can further transmit the memory mapped transaction request to other NPI switches 408 or to a protocol block 410 based on a destination identification of the memory mapped transaction request. The NPI switches 408 can be interconnected in any appropriate topology. In some examples, the NPI switches 408 are interconnected as a tree topology to the root node 404. The protocol block 410 can then translate the memory mapped transaction request into a format implemented by the register block 212. The register block 212 is illustrated in FIG. 4 as an example of a slave endpoint circuit to which the NPI 210 can be connected. The NPI 210 can further be connected to other slave endpoint circuits.

The PMC 402 is further connected to the configuration interconnect 108, which is in turn connected to the programmable logic regions 110. The PMC 402 is configured to program the fabric of the programmable logic regions 110 through the configuration interconnect 108. The configuration interconnect 108 is a delivery mechanism for programming programmable units on the SoC 102 that is independent of the delivery mechanism of the NPI 210 for programming other programmable units (e.g., slave endpoint circuits) on the SoC 102.

Figure 5:
FIG. 5 is a schematic of a routing table, according to an example of the present disclosure.

As previously stated, the register blocks 212 include registers that are programmed to create a corresponding routing table of an NPS 206. FIG. 5 illustrates a routing table 500, according to an example. The routing table 500 packs the registers according to destination identifications. Each packet that is received and subsequently transmitted by the NPS 206 includes a destination identification that is used by the routing table 500 to transmit and route the packet. For this example, the NPS 206 has four ports (Ports 0 through 3) and eight virtual channels (VC 0 through 7). The rows of the routing table correspond to a port-virtual channel combination (Port-VC) on which a packet is received. The columns of the routing table correspond to destination identifications (IDy) contained in the received packet. The entries of the routing table indicate an outgoing port on which the packet will be transmitted based on the Port-VC and IDy. In some examples, the entries for a given IDy are packed in one or more register of the register block 212. Pre-defined bits of the one or more registers are the entries of the routing table, and the pre-defined bits correspond with a Port-VC. The NPS 206 is configured to receive a packet, determine on which port the packet is received, determine the virtual channel of the packet, determine the destination identification contained in the packet, identify the outgoing port of the NPS 206 based on the receiving port, virtual channel, and destination identification as programmed in the registers that form the routing table, and transmit the packet on the outgoing port of the NPS 206.

In this example, there are thirty-two Port-VC combinations based on the four ports and eight virtual channels, and each entry for the outgoing port is at least two bits based on the four ports. Hence, in this example, two thirty-two bit registers are implemented for each IDy. Other examples, can implement registers for a routing table differently.

In some examples, by packing registers based on a destination identification, a routing table may be more easily reconfigured when a path is to be altered in a partial reconfiguration without having to reconfigure or interrupt other paths that are not to be reconfigured.

In other examples, other features may be implemented for the routing table. For example, multiple destination identifications can be segmented in the routing table, e.g., multiple destination identifications can be packed into one or more registers, to reduce overhead and/or processing of packets. In such examples, the segmenting may affect an ability to reconfigure a path. For example, if a part of a path that is to persist during partial reconfiguration corresponds to an entry in a segment of the routing table, the presence of the path that is to persist may prevent reconfiguring another path in the same segment.

Figures 6, 7:
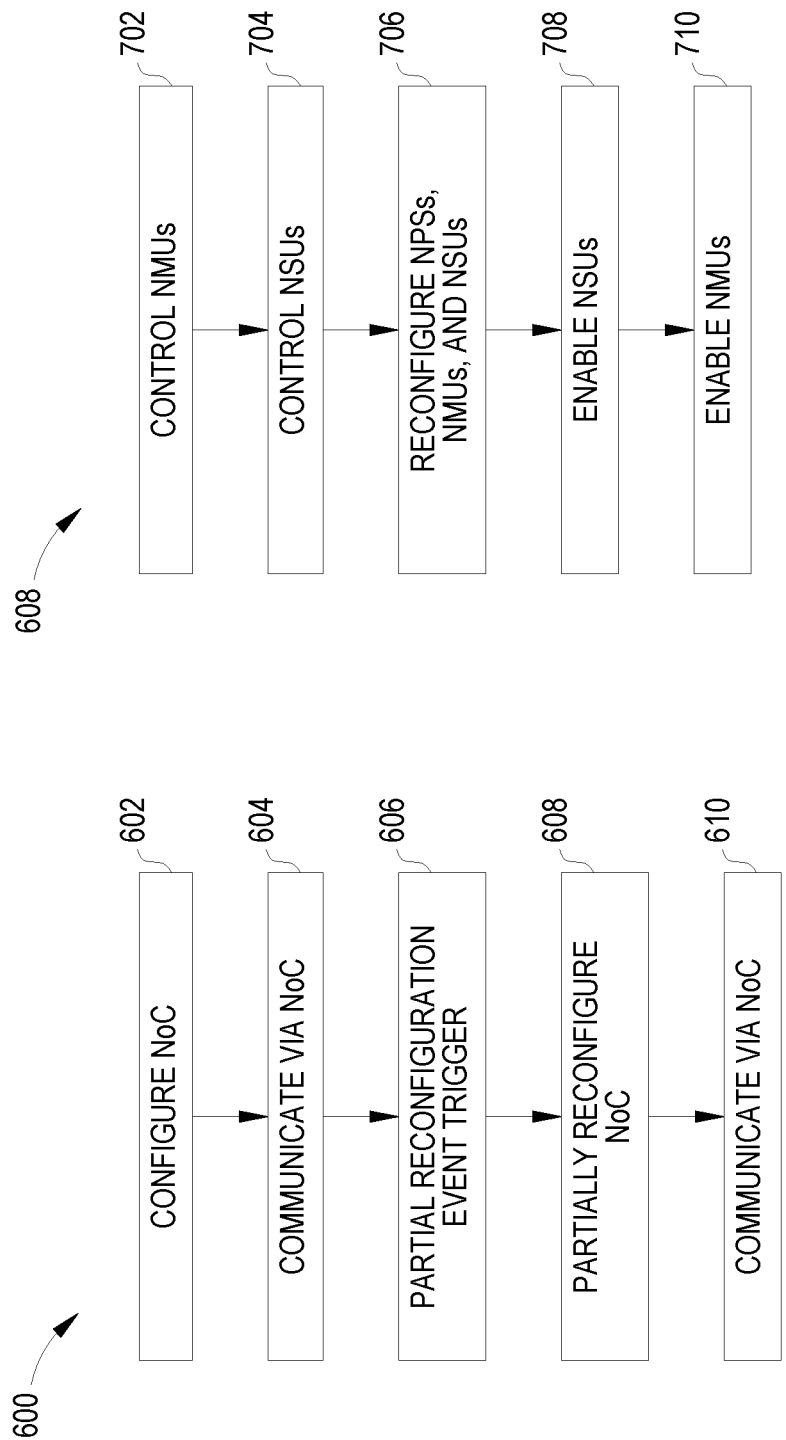
FIG. 6 is a method for operating a SoC, according to an example of the present disclosure.
FIG. 7 is a method to partially reconfigure a NoC, according to an example of the present disclosure.

FIG. 6 is a method 600 for operating a SoC 102, according to some examples. In operation 602, the NoC 106 is configured. More generally, the NoC 106 can be configured as part of a system-level configuration and/or any reconfiguration (e.g., partial or whole) thereof. Other subsystems of the SoC 102 can also be configured during operation 602. For example, the programmable logic regions 110 and/or the DPE array 112 can be configured. The NoC 106 can be configured via memory mapped transactions through the NPI 210 to write to register blocks 212 of NMUs 202, NSUs 204, and NPSs 206, as described above. The programmable logic regions 110 can be configured via the configuration interconnect 108. The DPE array 112 can be configured after the NoC 106 is configured and via the NoC 106 and IF block 114 of the DPE array 112. The configuration of the programmable logic regions 110 and/or DPE array 112 can instantiate one or more applications, or any subset thereof, on the programmable logic regions 110 and/or DPE array 112. Configuring the NoC 106 and any other components can be under the control of the processing system 104 (e.g., the PMC 402). The processing system 104 can obtain a PDI from memory, and the PDI can include the configuration data of the NoC 106, the bitstream for the programmable logic regions 110, and/or configuration data of the DPE array 112. The processing system 104 can thereafter coordinate and control the configuring of the components based on the PDI.

In operation 604, communications occur via the NoC 106. More generally, the SoC 102 is operated based on the configuration of the SoC 102, including the configuration of the NoC 106. Once configured, the processing system 104 can enable components for operation and initiate the operation. Various subsystems on the SoC 102 communicate, for example, application data with each other via the NoC 106. For example, applications, or subsets thereof, instantiated on the programmable logic regions 110 and/or DPE array 112 can communicate with each other or other subsystems (e.g., the processing system 104 and/or a memory controller) via the NoC 106.

In operation 606, a partial reconfiguration event trigger occurs. The partial reconfiguration event trigger may be use specific. For example, an application, or subset thereof, instantiated on the programmable logic regions 110 and/or DPE array 112 may conclude its task and generate an interrupt to trigger the partial reconfiguration. The interrupt can be communicated to the processing system 104 via the NoC 106, a dedicated interconnect, or another interconnect, and in response to receiving the interrupt, the processing system 104 (e.g., the PMC 402) takes control for partial reconfiguration.

In operation 608, the NoC 106 is partially reconfigured. More generally, the NoC 106 can be configured as part of a larger partial reconfiguration. Other subsystems of the SoC 102 can also be partially reconfigured during operation 608. Instances of circuit components of the NoC 106 and any other subsystem to be reconfigured during partial reconfiguration are referred to herein as a reconfiguration partition (RP). The circuit components or regions of the RP can be reconfigured during partial reconfiguration to transition from an unused to used state, used to unused state, and/or used to a different use state. Referring to the other subsystems, such as the programmable logic regions 110 and DPE array 112, various applications can be disabled and/or overwritten and different applications, or any subset thereof, can be instantiated on those subsystems by the partial reconfiguration. Partially reconfiguring the NoC 106 and any other subsystem can be under the control of the processing system 104 (e.g., the PMC 402). The processing system 104 can obtain a PDI from memory, and the PDI can include the configuration data and/or bitstream of the reconfiguration partition. The processing system 104 can thereafter coordinate and control the partial configuration of the circuit components based on the PDI.

The partial reconfiguration can reconfigure components in RP while other components outside of the RP are not reconfigured. Additionally, with respect to the NoC, communications (e.g., as occurring in operation 604) may continue via paths of the NoC that are not to be reconfigured (e.g., paths outside of the RP). Accordingly, a subset of resources of the NoC can be modified while another subset of resources of the NoC can remain active and undisturbed. Additional detail of the partial reconfiguration of the NoC 106 is described with respect to FIG. 7 below.

In operation 610, communications occur via the NoC 106. More generally, the SoC 102 is operated based on the configuration, with the partial reconfiguration, of the SoC 102. Once partial reconfiguration is complete, the processing system 104 can enable components for operation and initiate the operation. Various subsystems on the SoC 102 communicate, for example, application data with each other via the NoC 106, as described previously.

FIG. 7 is an example method of operation 608 of FIG. 6 to partially reconfigure the NoC 106, according to some examples. As stated previously, in operation 608, the partial reconfiguration of the NoC 106 is under the control of the processing system 104 (e.g., PMC 402). In operation 702, the processing system 104 controls the NMUs 202 in the RP that are to be reconfigured. The processing system 104 obtains from the PDI addresses or identifications of the NMUs 202 in the RP that are to be reconfigured. The processing system 104 then sends transaction requests through the NPI 210 to register blocks 212 of the NMUs 202 in the RP to control the NMUs 202. The transaction requests write to the register blocks 212 of the NMUs 202 values that cause the NMUs 202 to halt transmitting further packets to the NoC 106 and to clear any pending packets. The processing system 104 can then wait a predetermined amount of time to allow the packets to be cleared. After the predetermined amount of time, the processing system 104 can read, via a transaction request through the NPI 210, a status register of each NMU 202 to determine whether any NMU 202 still has a pending packet. If an NMU 202 still has a pending packet, an error can be generated. If no NMU 202 has a pending packet, the processing system 104, via transaction requests through the NPI 210, disables or halts operation of the NMUs 202.

In operation 704, the processing system 104 controls the NSUs 204 in the RP that are to be reconfigured. The processing system 104 obtains from the PDI addresses or identifications of the NSUs 204 in the RP that are to be reconfigured. The processing system 104 then sends transaction requests through the NPI 210 to register blocks 212 of the NSUs 204 in the RP to control the NSUs 204. The transaction requests write to the register blocks 212 of the NSUs 204 values that cause the NSUs 204 to reject subsequently received packets from the NoC 106 and to clear any pending packets. The processing system 104 can then wait a predetermined amount of time to allow the packets to be cleared. After the predetermined amount of time, the processing system 104 can read, via a transaction request through the NPI 210, a status register of each NSU 204 to determine whether any NSU 204 still has a pending packet. If an NSU 204 still has a pending packet, an error can be generated. If no NSU 204 has a pending packet, the processing system 104, via transaction requests through the NPI 210, disables or halts operation of the NSUs 204.

With the NMUs 202 and NSUs 204 controlled as described in operations 702 and 704, traffic on paths in the NoC 106 in the RP is quiesced. With the traffic quiesced, the RP can be reconfigured. In operation 706, the processing system 104 reconfigures the NPSs 206, NMUs 202, and NSUs 204 in the RP. The processing system 104 reconfigures the NPSs 206, NMUs 202, and NSUs 204 according to the configuration data contained in the PDI. The processing system 104 reconfigures the NPSs 206, NMUs 202, and NSUs 204 via memory mapped transactions through the NPI 210 as previously described. Traffic can continue on paths that do not enter and do not exit, or are independent of, the NoC 106 that is in the RP during the reconfiguration. Since NPSs 206, NMUs 202, and NSUs 204 that are not part of the RP are not reconfigured and not affected by the reconfiguration, paths among and between these NPSs 206, NMUs 202, and NSUs 204 may continue operation during the reconfiguration of the NPSs 206, NMUs 202, and NSUs 204 in the RP.

In operation 708, the processing system 104 enables the NSUs 204 that have been reconfigured into a used state. After the reconfiguration, the NSUs 204 that were disabled or halted before the reconfiguration are enabled and enter into normal operation. In operation 710, the processing system 104 enables the NMUs 202 that have been reconfigured into a used state. After the reconfiguration, the NMUs 202 that were disabled or halted before the reconfiguration are enabled and enter into normal operation. Hence, communication via the NPSs 206, NMUs 202, and NSUs 204 in the RP that was reconfigured is permitted to occur in operation 610 of FIG. 6.

FIGS. 8 through 12 illustrate use case scenarios for partially reconfiguring a NoC 106, according to some examples. FIGS. 8 through 12 each illustrate respective portions of a first subsystem 802, the NoC 106, and a second subsystem 804. Each of the subsystems 802 and 804 can be any subsystem of the SoC 102 that communicates via the NoC 106. For example, the subsystems 802 and 804 can be the programmable logic regions 110, the DPE array 112, the processing system 104, a memory controller, etc.

In the specific use case scenarios in FIGS. 8 through 12, at least one of the subsystems 802 and 804 is programmable and is part of a RP. Each RP represents instances of circuit components that are to be reconfigured (e.g., from used-to-unused, unused-to-used, and used-to-different use) during partial reconfiguration. An instance of circuit may be one or more registers of a register block 212 of an NPS 206 (as opposed to the NPS 206 itself). This level of granularity permits different paths 306 through a shared NPS 206 to be separately in an RP and in a static region, for example. It is noted that various paths 306 may share NPSs 206, where some of the paths 306 through a shared NPS 206 may be static while another of the paths 306 through the shared NPS 206 may be in an RP. With the routing table 500 in FIG. 5, these paths 306 through the shared NPS 206 may be logically separate such that one or more paths 306 may be in an RP while other paths may not be.

The RP can have a configuration of an initial reconfiguration module (RM) instantiated therein before partial reconfiguration, and can have a configuration of a subsequent RM instantiated therein as a result of the partial reconfiguration. Each RM may be a representation of, for example, an application, or subset thereof, for logic functions or the like.

FIGS. 8 through 11 further illustrate a static region 806 of the first subsystem 802 that is not programmable or is not to be reconfigured during a partial reconfiguration event. Various NMUs 202, NSUs 204, and paths 306 are illustrated in the NoC 106. Although not specifically illustrated, each path 306 includes one or more NPSs 206 and routing 208.

According to some examples, any path 306 in an initial configuration to an NMU 202 or NSU 204 outside of the RP persists through a partial reconfiguration of the NoC 106. Hence, interfaces, e.g., NMUs 202, within the RP to such paths likewise persist through the partial reconfiguration of the NoC 106. Further, reconfiguration of endpoint circuits 302 corresponding to such interfaces may be constrained due to the persistence of the paths 306 and interfaces. Additionally, any path 306 that originates outside of the RP and that includes an NMU 202 or NSU 204 in an initial configuration of the RP should be quiesced by the application at the origination of the path 306 (e.g., because such origination outside of the RP may not be under the control of the processing system 104 during the partial reconfiguration of operation 608). For example, the application should not generate and transmit traffic along the path 306 into the RP during the partial reconfiguration event. The processing system 104 can communicate to the application that the partial reconfiguration event is to occur, at which point, the application can halt communications via the path 306 into the RP.

Although the various RPs illustrated in FIGS. 8 through 12 are shown as a contiguous region, this is for simplicity. In practice, the RPs can include multiple disjoint and separate regions of the SoC 102.

Figure 8:
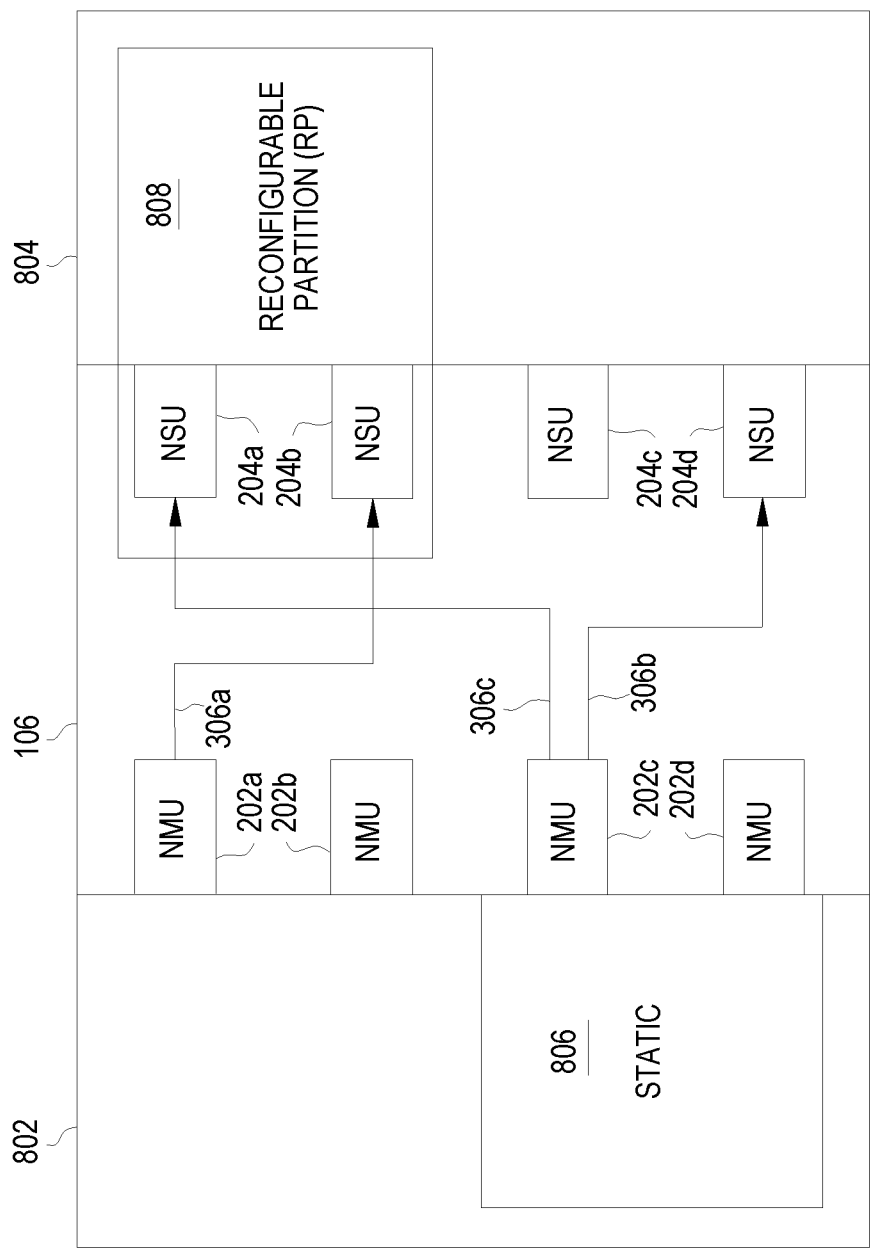
FIGS. 8 through 12 are use case scenarios for partially reconfiguring a NoC, according to some examples of the present disclosure.

Referring to FIG. 8, a RP 808 includes a region of the second subsystem 804 and NSUs 204a and 204b. In this example, the NMUs 202a and 202c, as interfaces of paths 306a and 306c, respectively, to origins outside of the RP 808, are not reconfigured during the partial reconfiguration. Hence, these interfaces persist through the partial reconfiguration. The processing system 104 can cause applications (e.g., static region 806) operating on the corresponding endpoint circuits of the NMUs 202a and 202c to not generate and transmit traffic along the paths 306a and 306c during partial reconfiguration. The NPSs 206 (or registers thereof) along the paths 306a and 306c can be reconfigured to change the paths 306 by reprogramming register blocks 212 for routing tables in those NPSs 206, can be reconfigured to change QoS, error control, etc., or can be reconfigured in any other way. The NSUs 204a and 204b are also reconfigured, such as to accommodate the reconfiguration of the paths 306a and 306c and/or the application, or subset thereof, that is instantiated on the second subsystem 804 by the partial reconfiguration. The reconfiguration of the NSUs 204a and 204b and any NPS 206 can be performed as described with respect to FIG. 7.

Figure 9:
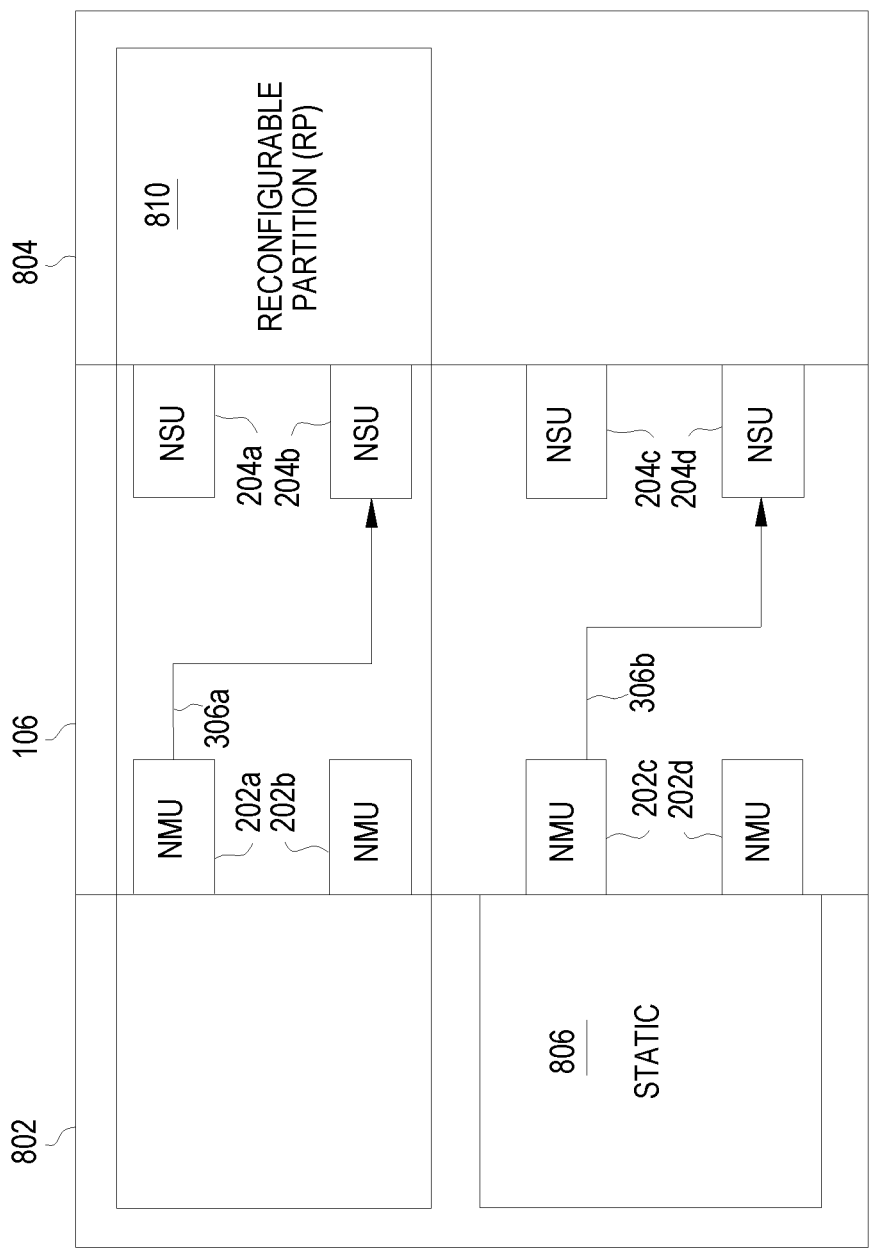

Referring to FIG. 9, a RP 810 includes a region of the first subsystem 802, a region of the second subsystem 804, NMUs 202a and 202b, NSUs 204a and 204b, and NPSs 206 (or registers thereof) along the path 306a. In this example, no path 306 crosses the logical boundary of the RP 810 (e.g., no path 306 has an origin outside of, but a termination internal to, the RP 810, or vice versa). The NMUs 202a and 202b and NSUs 204a and 204b that are in the RP 810 are used for communication between the applications, or subsets thereof, instantiated as part of the initial and/or subsequent RM of the RP 810 on the subsystems 802 and 804. The NMUs 202a and 202b, NPSs 206 (or registers thereof) along the path 306a, and NSUs 204a and 204b can be reconfigured, like described above with respect to FIG. 8. The reconfiguration of the NMUs 202a and 202b, NPSs 206 (or registers thereof) along the path 306a, and NSUs 204a and 204b can be performed as described with respect to FIG. 7. The remainder of the NoC 106 can continue operating through the partial reconfiguration since the partial reconfiguration does not affect any component outside of the RP 810. For example, the static region 806 and communications along path 306b can continue normal operation during the partial reconfiguration.

Figure 10:
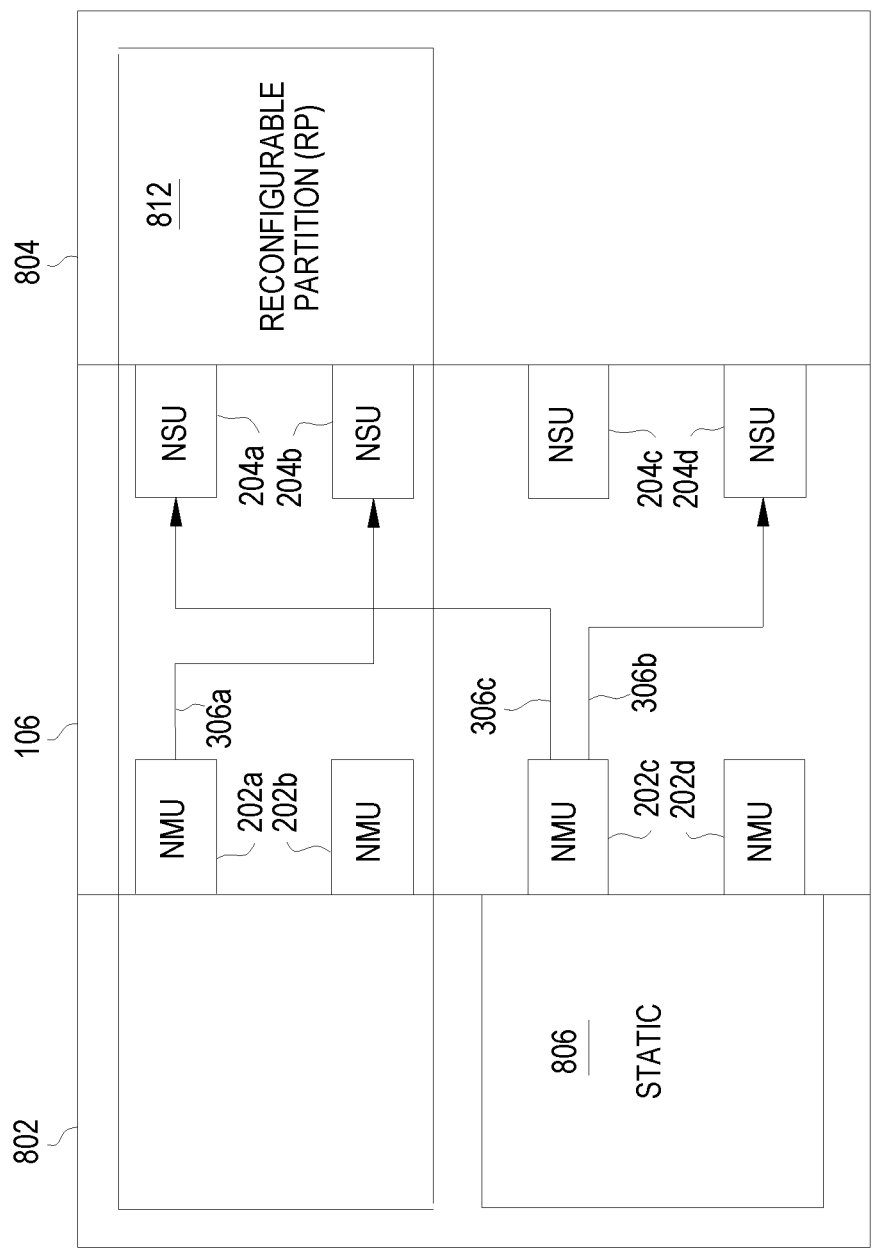

Referring to FIG. 10, a RP 812 includes a region of the first subsystem 802, a region of the second subsystem 804, NMUs 202a and 202b, NSUs 204a and 204b, and NPSs 206

(or registers thereof) along the paths 306a and 306c. In this example, path 306c crosses the logical boundary of the RP 812. The path 306c has an origin at an interface (e.g., NMU 202c) with the static region 806 in the first subsystem 802. The NSU 204a is in the RP 812 and interfaces with the path 306c. The NMUs 202a and 202b and NSU 204b that are in the RP 812 are used for communication between the applications, or subsets thereof, instantiated as part of the RP 812 on the subsystems 802 and 804.

In this example, the NMU 202c, as an interface origin of path 306c outside of the RP 812, is not reconfigured during the partial reconfiguration. Hence, this interface persists through the partial reconfiguration. The processing system 104 can cause the application (e.g., static region 806) operating on the corresponding endpoint circuit of the NMU 202c to not generate and transmit traffic along the path 306c during partial reconfiguration.

The NMUs 202a and 202b, NPSs 206 (or registers thereof) along the paths 306a and 306c, and NSUs 204a and 204b can be reconfigured, like described above with respect to FIG. 8. The reconfiguration of the NMUs 202a and 202b, NPSs 206 (or registers thereof) along the paths 306a and 306c, and NSUs 204a and 204b can be performed as described with respect to FIG. 7. Besides halting communications along the path 306c, the remainder of the NoC 106 can continue operating through the partial reconfiguration since the partial reconfiguration does not affect any other component outside of the RP 812. For example, the static region 806 and communications along path 306b can continue normal operation during the partial reconfiguration.

Figure 11:
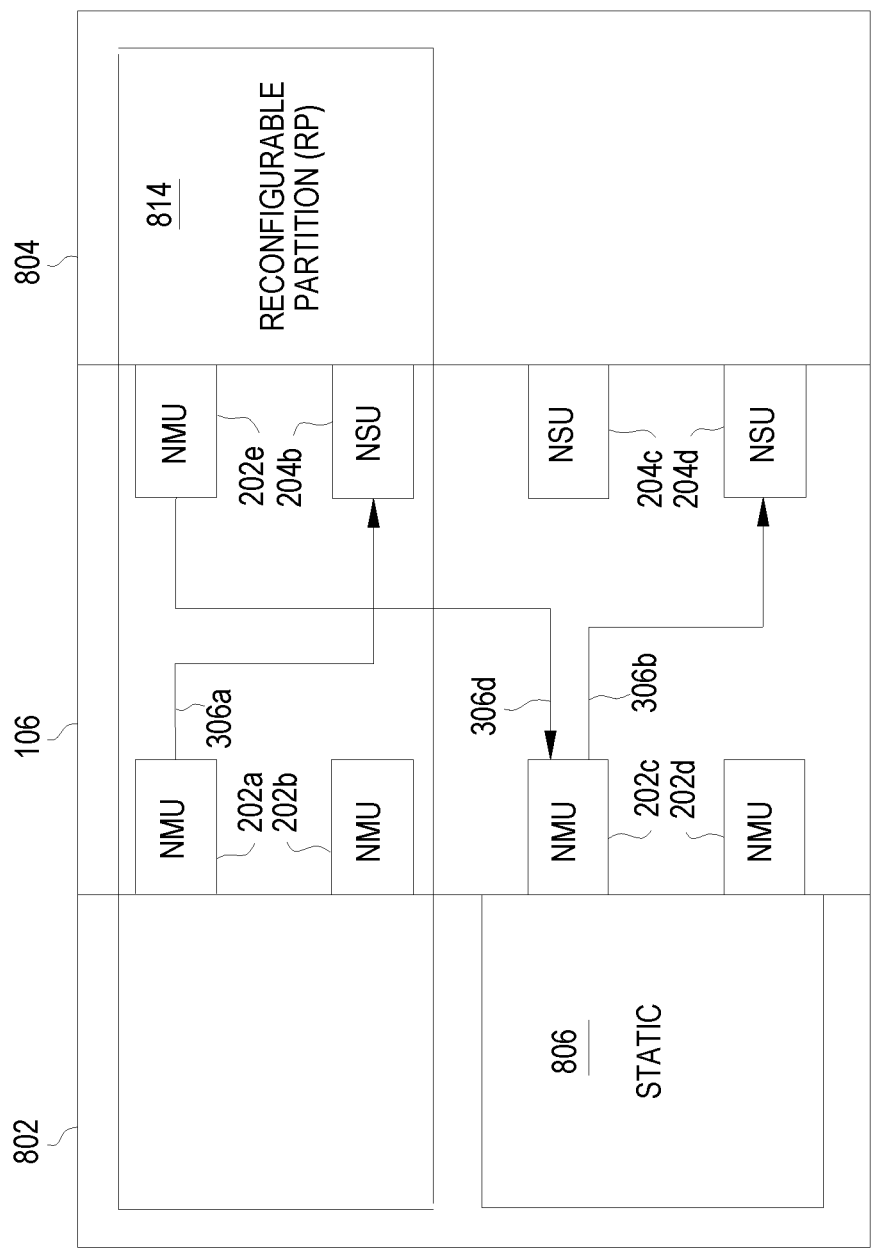

Referring to FIG. 11, a RP 814 includes a region of the first subsystem 802, a region of the second subsystem 804, NMUs 202a, 202b, and 202e, NSU 204b, and NPSs 206 (or registers thereof) along the paths 306a and 306d. In this example, path 306d crosses the logical boundary of the RP 814. The path 306d has an origin at an interface (e.g., NMU 202e) in the RP 814. The NMU 202c is outside of the RP 814 and interfaces with the path 306d. The NMUs 202a and 202b and NSU 204b that are in the RP 814 are used for communication between the applications, or subsets thereof, instantiated as part of the RP 814 on the subsystems 802 and 804.

In this example, NPSs 206 (or registers thereof) along the path 306d to an endpoint outside of the RP 814, are not reconfigured during the partial reconfiguration. Hence, this path 306d persists through the partial reconfiguration. The NMU 202e may be reconfigured to enable reconfiguration of an application, or subset thereof, in the RP 814.

The NMUs 202a and 202b, NPSs 206 (or registers thereof) along the path 306a, and NSU 204b can be reconfigured, like described above with respect to FIG. 8. The reconfiguration of the NMUs 202a and 202b, NPSs 206 (or registers thereof) along the path 306a, and NSU 204b can be performed as described with respect to FIG. 7. Besides halting communications along the path 306d by quiescing the NMU 202e in the RP 814, the remainder of the NoC 106 can continue operating through the partial reconfiguration since the partial reconfiguration does not affect any other component outside of the RP 814. For example, the static region 806 and communications along path 306b can continue normal operation during the partial reconfiguration.

In other examples, the path 306c of FIG. 10 and/or the path 306d of FIG. 11 may be reconfigured during the partial reconfiguration. It may be desirable to have boundary paths, such as paths 306c and 306d, persist through the partial reconfiguration, e.g., if active transactions may remain along the boundary paths during the reconfiguration. If an active transaction remains along a boundary path during reconfiguration, reconfiguring the boundary path may trigger an unrecoverable condition on the NoC 106. If the tools and/or applications at interfaces to the boundary paths can ensure that no active transaction remains pending on each boundary path, the boundary paths may be reconfigured (e.g., by removal of the path 306c and/or 306d) during the partial reconfiguration.

Figure 12:
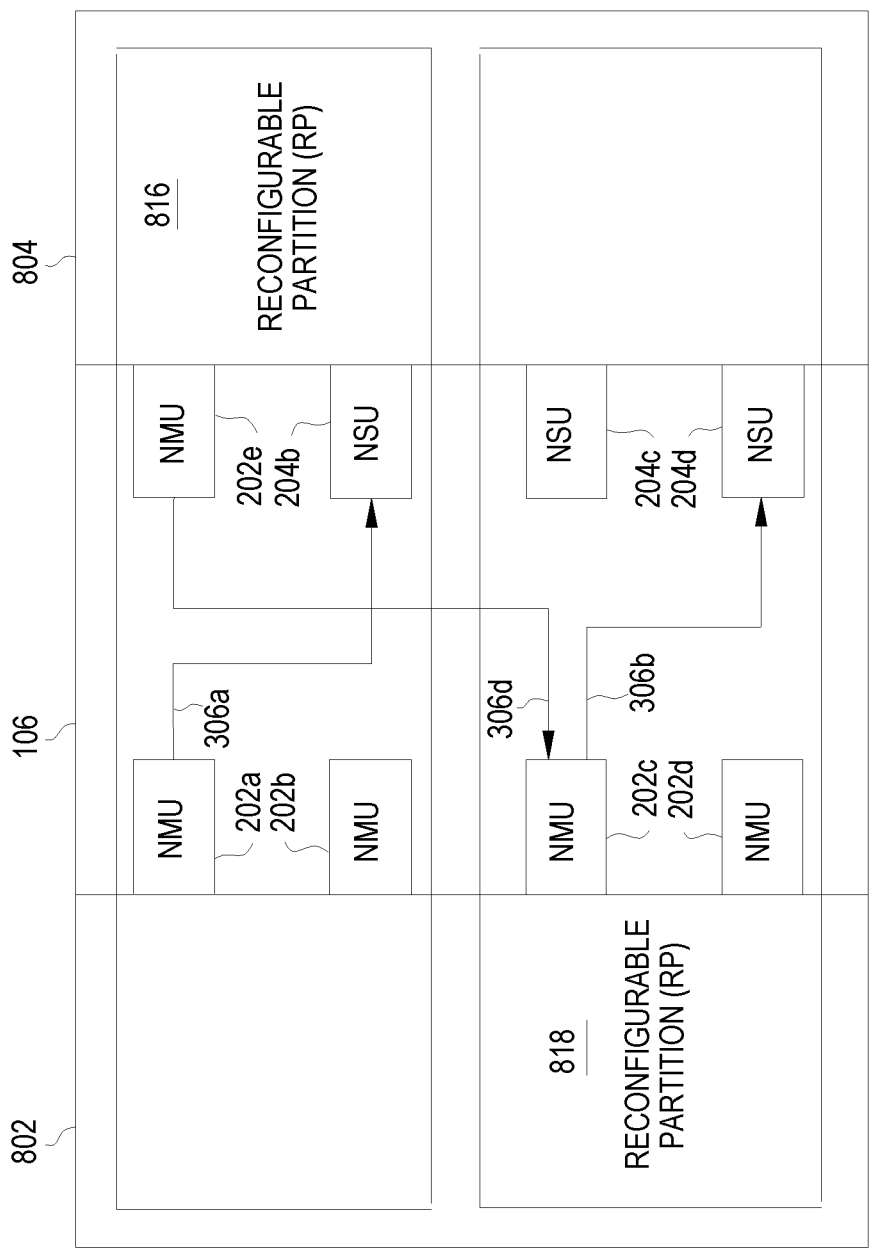

Referring to FIG. 12, a first RP 816 includes a region of the first subsystem 802, a region of the second subsystem 804, NMUs 202a, 202b, and 202e, NSU 204b, and NPSs 206 (or registers thereof) along the paths 306a and 306d, and a second RP 818 includes another region of the first subsystem 802, another region of the second subsystem 804, NMUs 202c and 202d, NSUs 204c and 204d, and NPSs 206 (or registers thereof) along the paths 306b and 306d. In this example, path 306d crosses logical boundaries of the RPs 816 and 818. The path 306d has an origin at an interface (e.g., NMU 202e) in the first RP 816 and has another interface (e.g., NMU 202c) in the second RP 818. The NMUs 202a and 202b and NSU 204b that are in the first RP 816 are used for communication between the applications, or subsets thereof, instantiated as part of the first RP 816 on the subsystems 802 and 804. Similarly, the NMU 202d and NSUs 204c and 204d that are in the second RP 818 are used for communication between the applications, or subsets thereof, instantiated as part of the second RP 818 on the subsystems 802 and 804.

In this example, NPSs 206 (or registers thereof) along the path 306d to an endpoint outside of the first RP 816 are not reconfigured during the partial reconfiguration. Hence, this path 306d persists through the partial reconfiguration. The NMU 202e may be reconfigured to enable reconfiguration of an application, or subset thereof, in the first RP 816. The NMU 202c, as an interface of path 306d to an origin outside of the second RP 818, is not reconfigured during the partial reconfiguration. Hence, this interface persists through the partial reconfiguration.

The NMUs 202a, 202b, and 202d, NPSs 206 (or registers thereof) along the paths 306a and 306b, and NSUs 204b, 204c, and 204d can be reconfigured, like described above with respect to FIG. 8. As part of the first RP 816, the reconfiguration of the NMUs 202a and 202b, NPSs 206 (or registers thereof) along the path 306a, and NSU 204b can be performed as described with respect to FIG. 7. Similarly, as part of the second RP 818, the reconfiguration of the NMU 202d, NPSs 206 (or registers thereof) along the path 306b, and NSUs 204c and 204d can be performed as described with respect to FIG. 7. The remainder of the NoC 106 can continue operating through the partial reconfiguration since the partial reconfiguration does not affect any other component outside of the first RP 816 and second RP 818.

Figure 13:
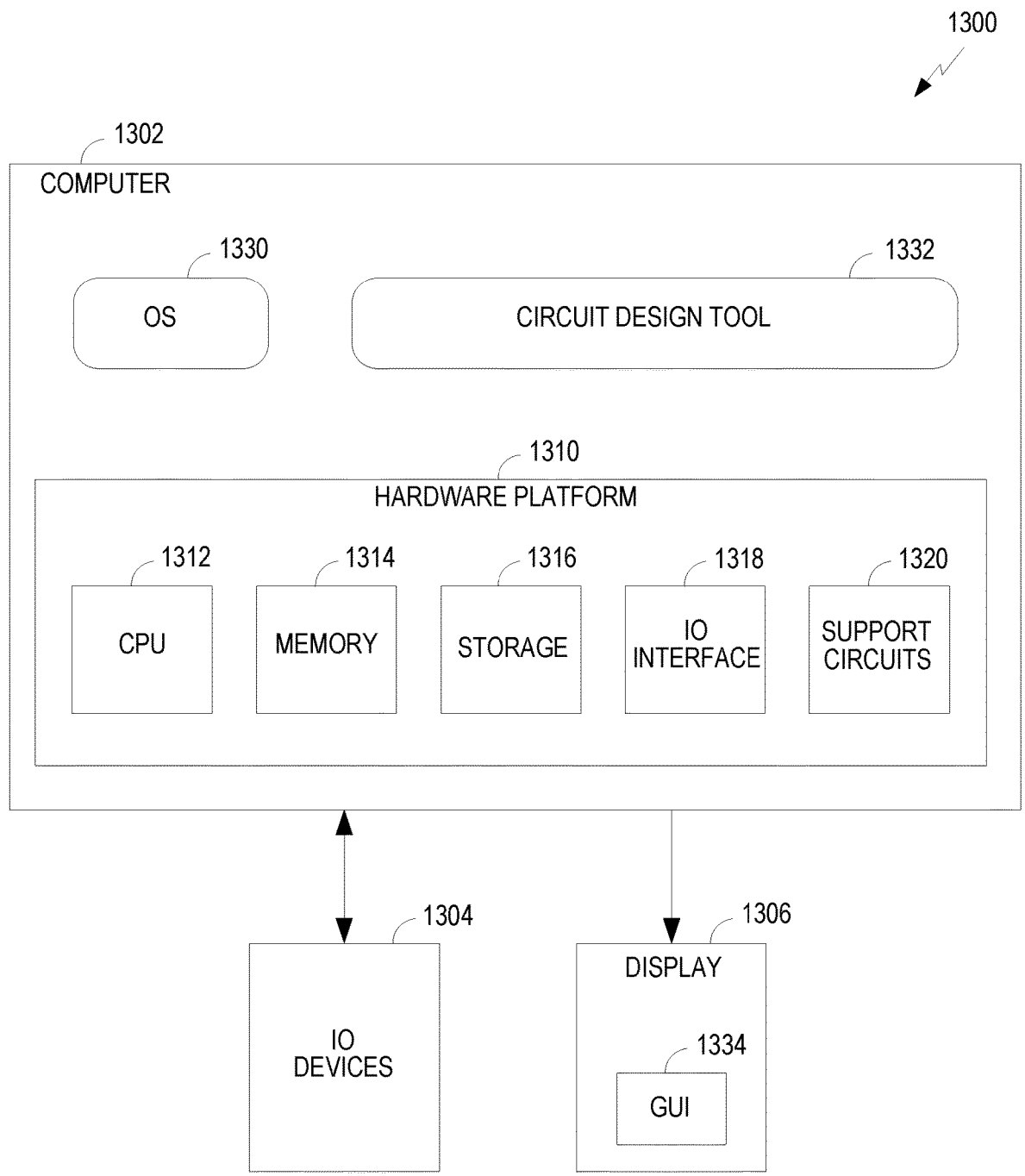
FIG. 13 is a block diagram depicting an example of a circuit design system, according to an example of the present disclosure.

FIG. 13 is a block diagram depicting an example of a circuit design system 1300, in accordance with an example of the present disclosure. The circuit design system 1300 includes a computer 1302 coupled to input/output (IO) devices 1304 and a display 1306. The computer 1302 includes a hardware platform 1310 that can include components of a computing device, such as a central processing unit (CPU) 1312, system memory 1314, storage 1316, an input/output (IO) interface 1318, and various support circuits 1320. The CPU 1312 can include one or more microprocessors. The CPU 1312 is configured to execute instructions that perform one or more operations described herein. The instructions can be stored in non-transitory memory, such as system memory 1314, storage 1316, or any other memory in the hardware platform 1310 (e.g., cache memory). The system memory 1314 includes one or more devices that store information and can include, for example, random access memory (RAM), read-only memory (ROM), or a combination thereof. The storage 1316 includes one or more local storage devices, such as hard disks, flash memory modules, solid state disks, optical disks, and the like. The storage 1316 can also include interface(s) configured for communication with one or more network data storage systems. The IO interface 1318 includes interfaces to/from the computer 1302. The IO interface 1318 can be coupled to the IO devices 1304, which can include a keyboard, mouse, and the like. The IO interface 1318 can also be coupled to the display 1306, which can present a graphical user interface (GUI) 1334 to a user. The support circuits 1320 can include cache, power supplies, clock circuits, data registers, IO interfaces, and the like.

The computer 1302 further includes a software platform comprising an operating system (OS) 1330 and a circuit design tool 1332. The OS 1330 and the circuit design tool 1332 include instructions that are executed by the CPU 1312, which instructions can be stored in system memory 1314, storage 1316, or any other memory. The OS 1330 can include any known operating system, such as Linux®, Microsoft Windows®, Mac OS®, and the like. The circuit design tool 1332 is an application that executes within the OS 1330, which provides an interface to the hardware platform 1310. Some operations of the circuit design tool 1332 are described below. An example circuit design tool that can be adapted to include the techniques described herein is the Vivado® Design Suite available from Xilinx, Inc. of San Jose, Calif., although other circuit design tools can be similarly adapted.

Figure 14:
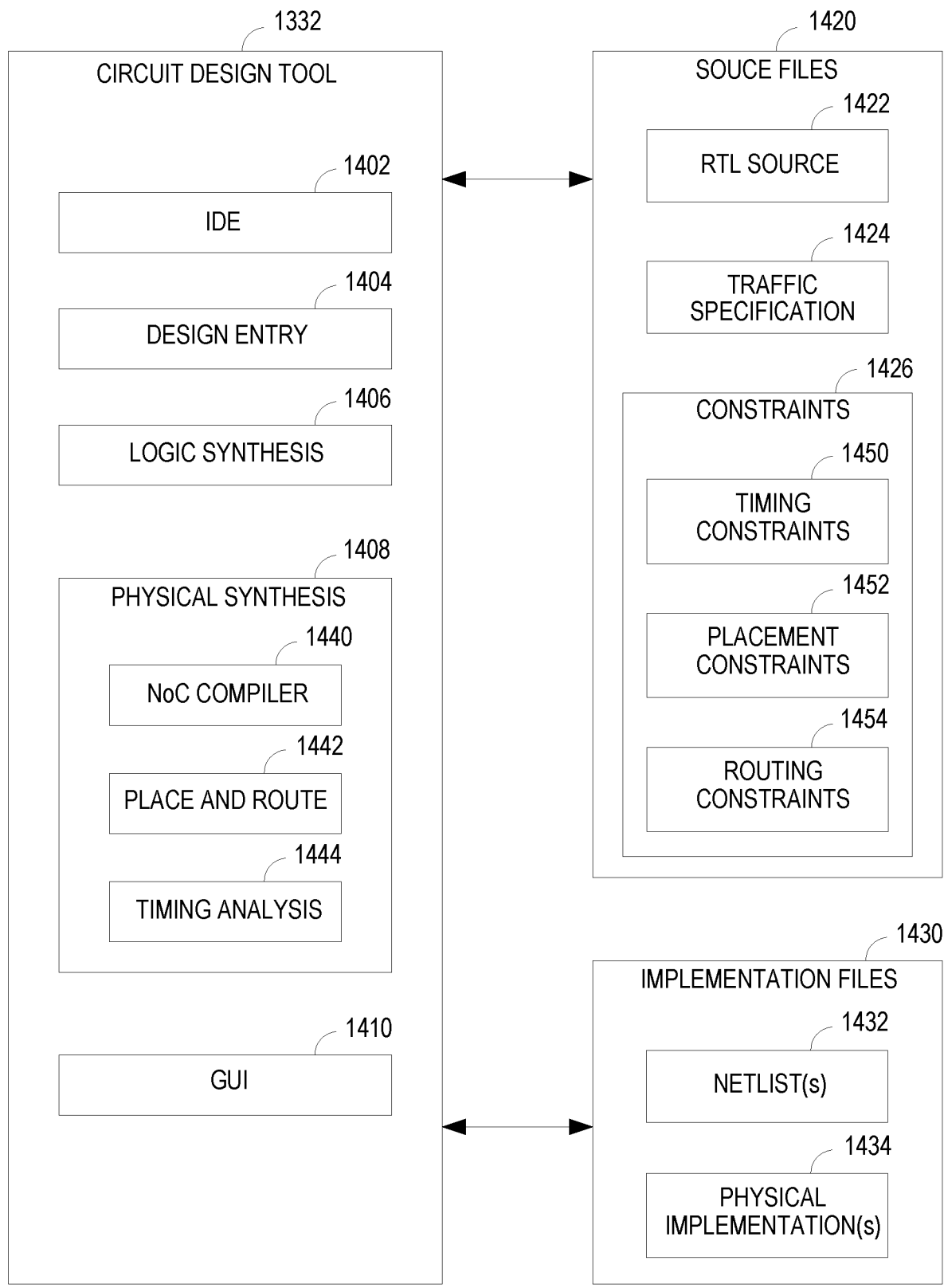
FIG. 14 is a block diagram showing an example of the circuit design tool of FIG. 13, according to an example of the present disclosure.

FIG. 14 is a block diagram showing an example of the circuit design tool 1332. The circuit design tool 1332 includes an integrated development environment (IDE) module 1402, a design entry module 1404, a logic synthesis module 1406, a physical synthesis module 1408, and a graphical user interface (GUI) module 1410. The modules 1402, 1404, 1406, 1408, and 1410 are just one example implementation of the circuit design tool 1332. The functions performed by the modules 1402, 1404, 1406, 1408, and 1410 described herein can be performed by a different configuration of one or more modules in the circuit design tool 1332. The modules in the circuit design tool 1332 can be implemented by circuitry that is part of an electronic system, by firmware in the electronic system, by software in the electronic system, or by a combination thereof. An example electronic system in which the circuit design tool 1332 can be implemented is described above in FIG. 13.

In general, the circuit design tool 1332 generates an abstract description of the circuit design, which is processed into a physical description of the circuit design for implementation in a predefined target IC ("target hardware"). The circuit design tool 1332 can process the abstract description of the circuit design through various intermediate transformations to produce the physical implementation of the circuit design. For a programmable IC (e.g., a field programmable gate array (FPGA)), a physical implementation of a circuit design can be formatted and loaded into the programmable IC to produce a physical circuit. Thus, the circuit design tool 1332 transforms an abstract representation of the circuit design into a physical representation of the circuit design that can be formatted to binary data (the physical implementation) that can be used to realize physical circuits in the target hardware.

A user can interact with the circuit design tool 1332 to specify or generate source files 1420. The source files 1420 can include register-transfer level (RTL) source 1422, traffic specification 1424, and constraints 1426. The RTL source 1422 includes one or more files specifying the circuit design at various levels of abstraction, such as a high-level block model of the circuit design, a lower level hardware description language (HDL) model of the circuit design, or the like. The RTL source 1422 can have little or no dependence on the target hardware and/or can be specific to the architecture of the target hardware. Further, the user can interact with the circuit design tool 1332 to specify or generate traffic specification 1424. The traffic specification 1424 is a file that includes identification of the paths in the NoC, and corresponding characteristics of those paths, that are in the circuit design. The traffic specification 1424 can specify virtual channels on a path, interrupts, quality of service (QoS), error handling and reporting, transaction control, power management, and address mapping control, etc. The constraints 1426 include one or more files specifying constraints on the circuit design. In particular, the constraints 1426 include timing constraints 1450 that specify timing performance requirements of the circuit design (e.g., operating frequency of particular clocks, maximum input path delays, maximum output path delays, etc.). The constraints 1426 can also include placement constraints 1452 and routing constraints 1454.

The circuit design tool 1332 processes the source files 1420 to generate implementation files 1430. The implementation files 1430 include one or more files specifying the circuit design with varying dependence of the target hardware. For example, the implementation files 1430 can include one or more netlists 1432 and one or more physical implementations 1434. The netlist(s) 1432 can include synthesized netlists, placed netlists, placed and routed netlists, and the like. The physical implementations 1434 can include PDIs, which can include bitstreams, configuration data, or other implementation information.

The IDE module 1402 provides a user interface through the GUI module 1410 to assemble, implement, and validate a circuit design for the target hardware. The IDE module 1402 controls the overall circuit design process, including invocation of the design entry module 1404, the logic synthesis module 1406, and the physical synthesis module 1408.

The design entry module 1404 generates a functional description of the circuit design in response to user input through the GUI module 1410. The functional description can include descriptions for a plurality of circuit components, such as flip-flops, memories, logic gates, processors, and the like (e.g., primitives), coupled together by connections (referred to as "nets" or "signals"). The GUI module 1410 can include a graphic interface through which a circuit designer connects symbols and blocks representing various components to produce a schematic of the circuit design, which is converted into the RTL source 1422. The connections can include paths through a NoC of the target hardware. Hence, the user, via the GUI module 1410, can specify attributes of the paths through the NoC, which can be used to generate the traffic specification 1424. The GUI module 1410 can include a text interface through which a user writes HDL code directly to produce the RTL source 1422 and traffic specification 1424. The GUI module 1410 can employ a combination of schematic and text-based entry. Via the GUI module 1410, the user can access various primitives stored in the source files 1420 for implementation in a circuit design. Each primitive can be in stored in the source files 1420 in one or multiple, such as in a format for use as a block or symbol through the GUI module 1410, in HDL code, the like, or a combination thereof.

The logic synthesis module 1406 produces a logical description of the circuit design from the functional description specified in the RTL source 1422. The logical description includes a logical representation of the circuit design in terms of specific logic elements. For example, the logic synthesis module 1406 can perform "technology mapping" that transforms generic circuit elements into technology-specific circuit elements. For example, the logical description can include a representation of the circuit design in terms of specific logic elements optimized to the architecture of a programmable IC, such as lookup tables (LUTs), carry logic, IO buffers, and like technology-specific components. In another example, the logical description can include a representation of the circuit design in terms of gates, flip-flops, and the like (sometimes referred to as a "gate-level description"). The logical description can be specified by a netlist 1432 (e.g., a synthesized netlist).

The physical synthesis module 1408 produces a physical description of the circuit design from the logical description. The physical description of the circuit design is a physical representation of the circuit design for implementation in a target IC. In an example, the physical synthesis module 1408 comprises a NoC compiler 1440, a place and route module 1442, and a timing analysis module 1444. The NoC compiler 1440 places instances of NMUs and NSUs specified in the logical description within a physical predefined layout of the target IC. The NoC compiler 1440 further routes paths between the NMUs and NSUs. The NoC compiler 1440 updates the traffic specification 1424 with identification of NMUs and NSUs that have been placed in the physical predefined layout. The place and route module 1442 places instances of circuit components (except circuit components within the NoC) specified in the logical description within the physical predefined layout of the target IC ("placement"). The place and route module 1442 also routes nets between the instances specified in the logical description using wires in the target IC. The place and route module 1442 can also verify that the physical description meets the placement constraints 1452 and routing constraints 1454 specified by the circuit designer.

In some examples, the physical synthesis module 1408 can further includes a map module that maps the instances of circuit components specified in the logical description onto specific types of primitive components defined in the architecture of the target programmable IC, which are then placed and routed by the place and route module 1442. The physical description can be specified by a netlist 1432 (e.g., a placed-and-routed netlist). The physical synthesis module 1408 can generate a physical implementation 1430 from the physical description (e.g., a PDI for a programmable IC).

In an example, the physical synthesis module 1408 comprises a timing analysis module 1444. The timing analysis module 1444 performs a timing analysis of the physical description of the circuit design. The timing analysis module 1444 verifies that the physical description meets the timing constraints 1450 specified by the circuit designer. The timing analysis can include various timing checks to ensure that the circuit design is fully constrained and that the circuit design meets timing requirements (e.g., slack for timing paths) derived in response to the timing constraints 1450.

Figure 15:
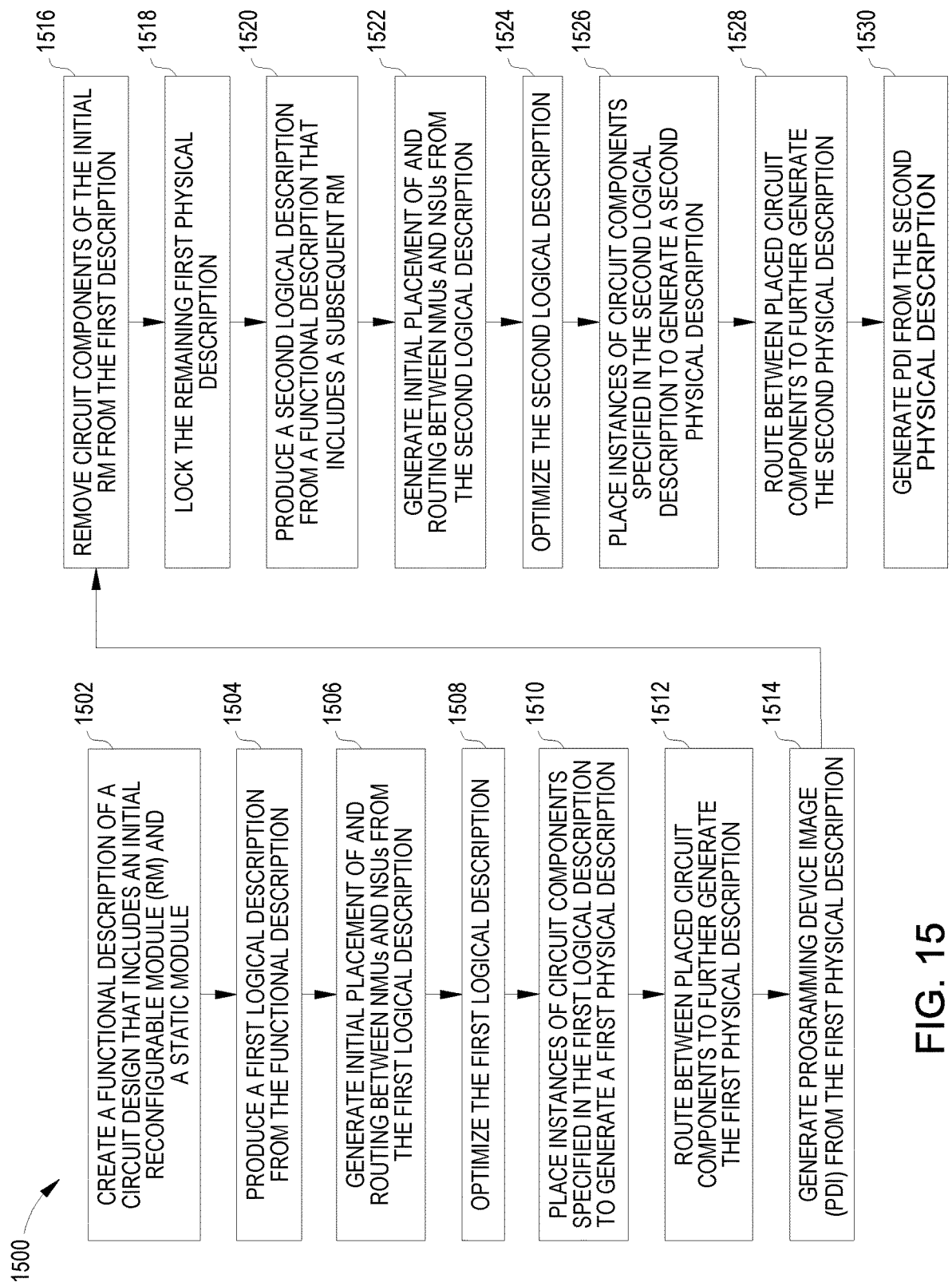
FIG. 15 is a method for generating a programming device image (PDI) for partial reconfiguration, according to an example of the present disclosure.

FIG. 15 illustrates a flowchart of a method 1500 for generating a PDI for partial reconfiguration, according to an example of the present disclosure. The method 1500 of FIG. 15 can be implemented by the circuit design tool 1332 as described above with respect to FIGS. 13 and 14.

In operation 1502, a functional description of a circuit design is created. The function description of the circuit design can be created using the design entry module 1404 described above and by the techniques described for creating the functional description by the design entry module 1404. The circuit design, and hence, the functional description, includes an initial RM that is to be reconfigured upon the occurrence of a partial reconfiguration event when operating on a device. The circuit design, and hence, the functional description, can also include a static module that remains through the partial reconfiguration. The initial RM can further include NMUs and/or NSUs that enable communication to/from the logic function of the initial RM with other subsystems via the NoC. The creation of the functional description further includes specifying the NMUs and NSUs that are within the initial RM.

During the creation of the functional description, a traffic specification for the NoC is created. The traffic specification includes identification of the paths in the NoC, and corresponding characteristics of those paths, that are in the functional description. The traffic specification can include information relating to virtual channels on a path, interrupts, quality of service (QoS), error handling and reporting, transaction control, power management, and address mapping control, for example. In some examples, the user, when creating the functional description, specifies the characteristics that are to populate the traffic specification. Additionally, whether NMUs and NSUs are within the initial RM or outside of the initial RM is specified in the traffic specification.

Additionally, during operation 1502 or subsequently during the method 1500, the circuit design, and hence, the functional description, can include a subsequent RM that is to be instantiated upon the occurrence of a partial reconfiguration event. The subsequent RM can further include NMUs and/or NSUs that enable communication to/from the logic function of the subsequent RM with other subsystems via the NoC. The creation of the functional description further includes specifying the NMUs and NSUs that are within the subsequent RM. The traffic specification, or an additional traffic specification, can include identification of paths, including NMUs and NSUs, within the subsequent RM, along with characteristics of those paths.

In operation 1504, a logical description is produced from the functional description. The functional description from which the logical description is produced includes the initial RM and static module. The logical description can be produced using the logic synthesis module 1406 described above.

In operation 1506, an initial placement of and routing between NMUs and NSUs is generated. The NoC compiler 1440 can place the NMUs and NSUs of the logical description in a physical description of the circuit design for implementation in the NoC of the target IC. The NoC compiler 1440 can further route paths between NMUs and NSUs by placing NPSs. The initial placement and routing can be independent of where logic functions or other functionality may be placed in programmable logic regions or other subsystems. The logical description can identify or indicate in which subsystems various logic functions or other functionality may be placed. The NoC compiler 1440 can therefore identify paths through the NoC (between different subsystems) by the logical description. The NoC compiler 1440 places the NMUs and NSUs, and generates the paths therebetween (e.g., by placing NPSs), at any respective, appropriate interfaces to the various subsystems. In placing and generating the paths, the NoC compiler 1440 attempts to meet the characteristics of the paths as defined in the traffic specification. If the NoC compiler 1440 is unable to place NMUs and NSUs and generate the paths that meet the characteristics in the traffic specification, an error may be generated and further processing to generate a PDI for the circuit design may be terminated. If the NoC compiler 1440 is able to initially place NMUs and NSUs and generate the paths that meet the characteristics in the traffic specification, further processing may proceed.

In operation 1508, the logical description is optimized. As used herein, "optimized" does not necessarily indicate generating a most optimal solution, particularly, since various solutions may have different costs and benefits; rather, "optimized" can include any improvement over a previous iteration. The logical description can be optimized using the logic synthesis module 1406 described above. For example, various logic elements in the logical description may be redundant or unnecessary based on other logic elements in the logical description, and the optimized logical description may omit such logic elements. Further, for example, some logic functions may be implemented using simpler or faster logic elements than what the logical description indicates, and the optimized logical description may implement the simpler or faster logic elements. In some examples, the optimization of operation 1508 may be omitted. Reference below to a logical description may refer to the original logical description or the optimized logical description.

In operation 1510, instances of circuit components specified in the logical description are placed in a physical representation of the architecture of the target IC to generate at least part of a physical description. The instances of circuit components corresponding to logic elements of the logic functions specified in the logical description can be placed by the place and route module 1442. The instances of circuit components corresponding to the NoC specified in the logical description can be placed by the NoC compiler 1440. The NoC compiler 1440 can place the NMUs and NSUs in the physical representation by adjusting the initial placement of the corresponding NMUs and NSUs from operation 1506. With the instances of circuit components in various subsystems (e.g., the programmable logic regions) being placed, corresponding NMUs and NSUs for communicating with various instances of circuit components can be determined, and the placement of those NMUs and NSUs can be determined by the NoC compiler 1440. With the NMUs and NSUs placed, NPSs can be placed to form paths between the NMUs and NSUs. The placement of NMUs and NSUs, and routing of paths (e.g., placement of NPSs) therebetween, is constrained to meet the characteristics specified in the traffic specification.

In operation 1512, routing between placed circuit components is generated in the physical representation of the architecture of the target IC to generate at least part of the physical description. The routing of operation 1512 can be routing within a respective subsystem (e.g., routing within a programmable logic region). The routing between instances of circuit components can be routed by the place and route module 1442.

In operation 1514, a PDI is generated based on the placed circuit components and the routing in the physical description. The PDI includes, for example, a bitstream for one or more programmable logic regions, configuration data for the NoC, and any other configuration data for other programmable components. Hence, the PDI can implement in the target IC the initial RM and the static module.

In operation 1516, the circuit components of the initial RM are removed from the physical description of the circuit design. Removing circuit components of the initial RM includes removing instances of circuit components corresponding to logic elements of the logic functions in the initial RM and removing NMUs and NSUs in the initial RM. Further, the traffic specification of paths in the NoC in the initial RM is deleted. The physical synthesis module 1408 can remove the circuit components corresponding to logic elements of the logic functions. The NoC compiler 1440 can remove the NMUs and NSUs and can delete the traffic specification of the paths.

In operation 1518, the remaining physical description of the circuit design is locked. The remaining instances of circuit components corresponding to logic elements of the logic functions in the programmable logic regions and routing therebetween, for example, are locked. Additionally, remaining paths, including placement of remaining NMUs and NSUs, are locked. The locking of these components in the physical description can be by the physical synthesis module 1408.

In operation 1520, a logical description is produced from the functional description of the subsequent RM, similar to operation 1504.

In operation 1522, an initial placement of and routing between NMUs and NSUs for the subsequent RM is generated using unlocked components of the physical description, similar to operation 1506. While placing NMUs and NSUs and routing between the NMUs and NSUs, locked NMUs, NSUs, and paths (e.g., that were locked in operation 1518) remain locked and unmodified. Hence, the initial placement of and routing between NMUs and NSUs honors the placements of the locked NMUs and NSUs and the routing of locked paths. Hence, the initial placement of and routing in operation 1522 uses NMUs, NSUs, and paths that are not locked as a result of the static module. Accordingly, the initial placement of and routing between NMUs and NSUs can implement, at least initially, the use case scenarios described above with respect to FIGS. 8 through 12.

In operation 1524, the logical description of the subsequent RM is optimized, similar to operation 1508. In operation 1526, instances of circuit components specified in the logical description of the subsequent RM are placed using unlocked components of the physical description to generate at least part of another (or modified) physical description, similar to operation 1510. During operation 1526, placement and routing for locked static logic, as well as locked NMUs, NSUs, and paths, are honored and not modified. Hence, the placement of circuit components in operation 1526 uses circuit components that are not locked as a result of the static module. Accordingly, the placement of and routing between NMUs and NSUs can implement the use case scenarios described above with respect to FIGS. 8 through 12. In operation 1528, routing between placed instances of circuit components of the subsequent RM is generated in the modified physical description, similar to operation 1512. In operation 1530, a PDI is generated based on the modified physical description, similar to operation 1514. The PDI can be included in the PDI generated in operation 1514 or can be separate from the PDI generated in operation 1514. The PDI generated in operation 1530 can include a partial bitstream for one or more programmable logic regions, partial configuration data for the NoC, and any other configuration data for other programmable components.

Although not specifically illustrated in FIG. 15, timing and analysis may be performed on the physical descriptions, and optimization may be implemented to improve placement and routing for, e.g., lower skew times, etc. Other operations may likewise be performed.

While the foregoing is directed to specific examples, other and further examples may be devised without departing from the basic scope thereof, and the scope thereof is determined by the claims that follow.

What is claimed is:

1. A method for operating an integrated circuit, the method comprising:
   configuring a Network-on-Chip (NoC) on the integrated circuit;
   communicating between subsystems on the integrated circuit via the NoC;
   partially reconfiguring the NoC, wherein a first subset of the NoC is reconfigured during the partial reconfiguration of the NoC, and a second subset of the NoC is capable of continuing to pass communications uninterruptedly during the partial reconfiguration of the NoC;
   partially reconfiguring a programmable subsystem on the integrated circuit to instantiate an application on the programmable subsystem, wherein partially reconfiguring the programmable subsystem is concurrent with the partial reconfiguration of the NoC; and
   after the partial reconfiguration of the NoC, communicating between two or more of the subsystems via the first subset of the NoC.

2. The method of claim 1, wherein partially reconfiguring the NoC includes:
   quiescing the first subset of the NoC; and
   after quiescing the first subset of the NoC, reconfiguring the first subset of the NoC.

3. The method of claim 1, wherein the NoC includes NoC Master Units (NMUs), NoC Slave Units (NSUs), NoC Packet Switches (NPSs), and routing, the NPSs being interconnected between the NMUs and the NSUs by the routing.

4. The method of claim 3, wherein partially reconfiguring the NoC includes:
   controlling the NMUs in the first subset of the NoC to halt transmitting communication packets;
   controlling the NSUs in the first subset of the NoC to reject received communication packets;
   after controlling the NMUs and the NSUs in the first subset of the NoC to halt and reject, respectively, reconfiguring the NMUs in the first subset of the NoC, the NSUs in the first subset of the NoC, and the NPSs in the first subset of the NoC; and
   after reconfiguring the NMUs, the NSUs, and the NPSs in the first subset of the NoC, enabling the NMUs and the NSUs in the first subset of the NoC for communication.

5. The method of claim 4, wherein partially reconfiguring the NoC further includes causing applications operating on the integrated circuit and not to be reconfigured during the partial reconfiguration of the NoC to halt transmitting communications via the first subset of the NoC.

6. The method of claim 4, wherein:
   the NMUs in the first subset of the NoC include one or more first control registers, controlling the NMUs in the first subset of the NoC including writing to the one or more first control registers; and
   the NSUs in the first subset of the NoC include one or more second control registers, controlling the NMUs in the first subset of the NoC including writing to the one or more second control registers.

7. The method of claim 3, wherein:
   each of the NPSs has ports configured to receive and transmit communication packets, the ports being connected to respective routing;
   each of the NPSs further includes registers configured to store a routing table; and
   each of the registers is associated with one or more destination identifications, pre-defined bit locations of each of the registers corresponding to respective ports on which communication packets are capable of being received, written values of the pre-defined bit locations identifying respective ports through which communication packets are to be transmitted, a received communication packet being transmitted on a port identified by a respective written value in one or more of the predefined bit locations corresponding to a port on which the received communication packet is received and in a respective register associated with a destination identification contained in the received communication packet.

8. The method of claim 7, wherein partially reconfiguring the NoC includes reconfiguring the NPSs in the first subset of the NoC including writing to one or more of the registers to reconfigure the routing table.

9. The method of claim 3, wherein:
   configuring the NoC includes configuring a first path and a second path each through a first NPS of the NPSs; and
   partially reconfiguring the NoC includes reconfiguring the first path through the first NPS, wherein the second path through the first NPS is capable of continuing to pass communications uninterruptedly during the partial reconfiguration of the NoC.

10. The method of claim 1, wherein:
    the NoC further includes a NoC Peripheral Interconnect (NPI); and
    partially reconfiguring the NoC comprises writing configuration data to components of the first subset of the NoC using memory mapped transactions via the NPI.

11. An integrated circuit comprising:
    a first subsystem on a chip, the first subsystem being configured to be partially reconfigurable to instantiate an application on the first subsystem;
    a second subsystem on the chip; and
    a Network-on-Chip (NoC) on the chip and communicatively connected between the first subsystem and the second subsystem, the NoC being configurable to establish communication paths through the NoC, the NoC being configured to be partially reconfigurable to reconfigure a first subset of the communication paths while a second subset of the communication paths are capable of passing communications uninterruptedly, the NoC being configured to be partially reconfigured concurrently with partially reconfiguring the first subsystem.

12. The integrated circuit of claim 11, wherein:
    the NoC includes NoC Master Units (NMUs), NoC Slave Units (NSUs), NoC Packet Switches (NPSs), and routing, the NPSs being interconnected between the NMUs and the NSUs by the routing;
    each of the NPSs has ports configured to receive and transmit communication packets, the ports being connected to respective routing;
    each of the NPSs further includes registers configured to store a routing table; and
    each of the registers is associated with one or more destination identifications, pre-defined bit locations of each of the registers corresponding to respective ports on which communication packets are capable of being received, written values of the pre-defined bit locations identifying respective ports through which communication packets are to be transmitted, a received communication packet being transmitted on a port identified by a respective written value in one or more of the predefined bit locations corresponding to a port on which the received communication packet is received and in a respective register associated with a destination identification contained in the received communication packet.

13. The integrated circuit of claim 11, wherein:
the NoC includes NoC Master Units (NMUs), NoC Slave Units (NSUs), NoC Packet Switches (NPSs), and routing, the NPSs being interconnected between the NMUs and the NSUs by the routing;
each of the NMUs includes one or more first control registers, each of the NMUs being controllable to halt transmitting communications based on a value written to the one or more first control registers; and
each of the NSUs includes one or more second control registers, each of the NMUs being controllable to reject communications based on a value written to the one or more second control registers.

14. The integrated circuit of claim 11, wherein the NoC includes a NoC Peripheral Interconnect (NPI), the NoC being configurable by transmitting memory mapped transactions via the NPI.

15. The integrated circuit of claim 11, wherein the first subsystem is a programmable subsystem.

16. The method of claim 1, wherein:
the NoC includes NoC Packet Switches (NPSs) and routing, the NPSs being interconnected by the routing;
each of the NPSs has ports configured to receive and transmit communication packets, the ports being connected to respective routing;
each of the NPSs further includes registers configured to store a routing table; and
each of the registers is associated with one or more destination identifications, pre-defined bit locations of each of the registers corresponding to respective ports on which communication packets are capable of being received, written values of the pre-defined bit locations identifying respective ports through which communication packets are to be transmitted, a received communication packet being transmitted on a port identified by a respective written value in one or more of the predefined bit locations corresponding to a port on which the received communication packet is received and in a respective register associated with a destination identification contained in the received communication packet.

17. The method of claim 1, wherein partially reconfiguring the NoC includes:
obtaining, by a processing system on the integrated circuit, a programming device image from memory, the programming device image including configuration data; and
writing, by the processing system, the configuration data to the first subset of the NoC during the partial reconfiguration.

18. A method for operating an integrated circuit, the method comprising:
configuring a Network-on-Chip (NoC) on the integrated circuit, the NoC including interconnected NoC Packet Switches (NPSs), each NPS of the NPSs including one or more registers configured to store a routing table for routing communications through the respective NPS;
after configuring the NoC, communicating between subsystems on the integrated circuit via the NoC;
partially reconfiguring the NoC, wherein a first subset of the NoC is reconfigured during the partial reconfiguration, and a second subset of the NoC is capable of continuing to pass communications uninterruptedly during the partial reconfiguration, wherein partially reconfiguring the NoC includes reconfiguring one or more NPSs of the NPSs in the first subset of the NoC including writing, for the one or more NPSs of the NPSs in the first subset of the NoC, to one or more of the registers of the respective NPS to reconfigure the respective routing table; and
after the partial reconfiguration, communicating between two or more of the subsystems via the first subset of the NoC.

19. The method of claim 18, wherein:
the NoC includes NoC Master Units (NMUs) and NoC Slave Units (NSUs), the interconnected NPSs being interconnected between and to the NMUs and the NSUs; and
partially reconfiguring the NoC includes:
controlling the NMUs in the first subset of the NoC to halt transmitting communication packets;
controlling the NSUs in the first subset of the NoC to reject received communication packets;
after controlling the NMUs and the NSUs in the first subset of the NoC to halt and reject, respectively, reconfiguring the NMUs in the first subset of the NoC, the NSUs in the first subset of the NoC, and the NPSs in the first subset of the NoC; and
after reconfiguring the NMUs, the NSUs, and the NPSs in the first subset of the NoC, enabling the NMUs and the NSUs in the first subset of the NoC for communication.

20. The method of claim 18, wherein:
the NoC includes NoC Master Units (NMUs) and NoC Slave Units (NSUs), the interconnected NPSs being interconnected between and to the NMUs and the NSUs;
each NPS of the NPSs has ports configured to receive and transmit communication packets, each port of the respective NPS being connected to a port of an NMU of the NMUs, an NSU of the NSUs, or another NPS of the NPSs; and
each register of the registers of a respective NPS is associated with one or more destination identifications, pre-defined bit locations of each register of the registers corresponding to respective ports on which communication packets are capable of being received, written values of the pre-defined bit locations identifying respective ports through which communication packets are to be transmitted, a received communication packet being transmitted on a port identified by a respective written value in one or more of the predefined bit locations corresponding to a port on which the received communication packet is received and in a respective register associated with a destination identification contained in the received communication packet.

21. The method of claim 18, wherein:
configuring the NoC includes configuring a first path and a second path each through a first NPS of the NPSs; and
partially reconfiguring the NoC includes reconfiguring the first path through the first NPS, wherein the second path through the first NPS is capable of continuing to pass communications uninterruptedly during the partial reconfiguration.

22. The method of claim 18, wherein:
the NoC further includes a NoC Peripheral Interconnect (NPI); and
partially reconfiguring the NoC comprises writing configuration data to components of the first subset of the NoC using memory mapped transactions via the NPI.

* * * * *